United States Patent
Brown et al.

(10) Patent No.: US 10,501,967 B2
(45) Date of Patent: Dec. 10, 2019

(54) RETRACTABLE HANDLE ARRANGEMENT

(71) Applicant: JAGUAR LAND ROVER LIMITED, Whitley, Coventry, Warwickshire (GB)

(72) Inventors: Olly Brown, Coventry (GB); Peter Lumsden, Wolston (GB); Bruno Gaouyer, Leamington Spa (GB); Sean Edwards, Coventry (GB); Brian Lidgard, Banbury (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 152 days.

(21) Appl. No.: 15/561,483

(22) PCT Filed: Mar. 25, 2016

(86) PCT No.: PCT/EP2016/056694
§ 371 (c)(1),
(2) Date: Sep. 25, 2017

(87) PCT Pub. No.: WO2016/151131
PCT Pub. Date: Sep. 29, 2016

(65) Prior Publication Data
US 2018/0106082 A1  Apr. 19, 2018

(30) Foreign Application Priority Data

Mar. 25, 2015 (GB) .................... 1505034.7
Mar. 25, 2015 (GB) .................... 1505036.2
Mar. 25, 2015 (GB) .................... 1505037.0

(51) Int. Cl.
*E05B 1/00* (2006.01)
*E05B 85/10* (2014.01)
(Continued)

(52) U.S. Cl.
CPC .......... *E05B 85/107* (2013.01); *B60J 5/0415* (2013.01); *E05B 85/103* (2013.01); *E05B 81/06* (2013.01); *E05B 81/08* (2013.01); *E05B 81/76* (2013.01)

(58) Field of Classification Search
CPC ........ E05B 85/107; E05B 85/10; E05B 85/16; E05B 85/14; E05B 85/103; E05B 85/06;
(Continued)

(56) References Cited

U.S. PATENT DOCUMENTS 5,101,597 A * 4/1992 Pelachyk ................ E05B 79/06
16/DIG. 24
5,183,302 A * 2/1993 Pelachyk ................ E05B 85/12
292/336.3
(Continued)

FOREIGN PATENT DOCUMENTS

CN 202249187 U 5/2012
CN 103526992 A 1/2014
(Continued)

OTHER PUBLICATIONS

Combined Search and Examination Report for application No. GB1505036.2, dated Aug. 7, 2015, 8 pages.
(Continued)

*Primary Examiner* — Chi Q Nguyen
(74) *Attorney, Agent, or Firm* — Reising Ethington P.C.

(57) ABSTRACT

A retractable handle arrangement may include a handle having a swing-arm moveable about a pivot axis and arranged to couple the handle to a support structure for movement between a stowed state and a deployed state. The swing arm may, in the deployed state, engage the support structure so as to substantially prevent lateral play of the handle.

18 Claims, 16 Drawing Sheets

(51) Int. Cl.
*B60J 5/04* (2006.01)
*E05B 81/06* (2014.01)
*E05B 81/08* (2014.01)
*E05B 81/76* (2014.01)

(58) Field of Classification Search
CPC .......... E05B 81/06; E05B 81/08; E05B 81/76; E05Y 2600/41; E05Y 2600/46; E05Y 2600/12; E05Y 2600/13; E05Y 2900/531; E05F 15/63
USPC ....... 49/503, 460, 394, 381, 393; 292/336.3, 292/DIG. 31, DIG. 3
See application file for complete search history.

(56) References Cited

U.S. PATENT DOCUMENTS

| | | | | |
|---|---|---|---|---|
| 5,282,657 | A * | 2/1994 | Clinch | ................... E05B 85/12 292/336.3 |
| 5,450,735 | A | 9/1995 | Esaki et al. | |
| 5,884,434 | A * | 3/1999 | Dedrich | ................... E05B 85/12 296/146.7 |
| 6,606,889 | B1 * | 8/2003 | Tweedy | ................ E05B 13/002 292/DIG. 31 |
| 8,701,353 | B2 | 4/2014 | Patel et al. | |
| 9,322,191 | B2 | 4/2016 | Müller et al. | |
| 2004/0177478 | A1 | 9/2004 | Louvel et al. | |
| 2013/0106122 | A1 | 5/2013 | Do et al. | |
| 2013/0161964 | A1 * | 6/2013 | Ishida | ................... E05B 85/14 292/336.3 |
| 2013/0241215 | A1 * | 9/2013 | Halliwell | .............. E05B 85/107 292/336.3 |
| 2014/0000167 | A1 | 1/2014 | Patel et al. | |
| 2015/0233154 | A1 * | 8/2015 | Smart | ..................... E05B 81/28 70/237 |
| 2015/0308151 | A1 * | 10/2015 | Minter | ..................... E05C 19/10 49/394 |
| 2015/0315826 | A1 * | 11/2015 | Lang | ..................... E05B 85/103 49/503 |
| 2015/0368933 | A1 * | 12/2015 | Papanikolaou | ......... E05B 77/06 49/31 |
| 2016/0185397 | A1 * | 6/2016 | Huston | ................ B62D 33/037 49/394 |

FOREIGN PATENT DOCUMENTS

| | | |
|---|---|---|
| DE | 1839349 U | 10/1961 |
| DE | 102010016869 A1 | 11/2011 |
| DE | 102011001001 A1 | 6/2012 |
| GB | 2180291 A | 3/1987 |
| GB | 2277957 A | 11/1994 |
| GB | 2345437 A | 7/2000 |
| KR | 1020050100215 A | 10/2005 |
| WO | WO03004809 A1 | 1/2003 |
| WO | WO2012175647 A2 | 12/2012 |
| WO | WO2015074020 A1 | 5/2015 |

OTHER PUBLICATIONS

Interbational Search Report for International application No. PCT/EP2016/056694, dated Jun. 29, 2016, 5 pages.
Written Opinion for International application No. PCT/EP2016/056694, dated Jun. 29, 2016, 7 pages.
Chinese Office Action corresponding to application No. 201680017442.4, dated Nov. 28, 2018, 20 pages

* cited by examiner

RETRACTABLE HANDLE ARRANGEMENT

TECHNICAL FIELD

The present disclosure relates to a retractable handle arrangement for a door or other type of closure, in particular for a vehicle. Aspects of the disclosure relate to a handle arrangement, to a body component incorporating the handle arrangement, and to a vehicle.

BACKGROUND

The invention will be described in the context of a car door, but it could also be used with other closures such as trunks/tailgates, or with other types of vehicles such as boats or aircraft. In a broad sense, the invention may also be used in non-vehicle applications.

A relatively recent development in the design of vehicle door handles is the retractable handle in which a flush-mounted handle is retractably mounted to the vehicle door such that the handle is flush with an outer door skin of the vehicle. This means that the handle can move between two states: a stowed or retracted state in which the handle is flush-mounted and a deployed or extended state in which the handle protrudes from the surrounding door surface so that it may be grasped by a user. The handles may be movable between the stowed and deployed states mechanically or by electrical means.

Once the handle is in the deployed state, it can be pulled, usually against a spring bias, to move the handle towards a third, operative, state to unlatch the door. In moving to the operative state the handle may unlatch the door mechanically, for example by acting on a Bowden cable coupled to the door latch, or electrically by acting on an electrical switch coupled to the latch. Examples of such a vehicle door handle are described in the applicant's co-pending US patent application no. US2013/0241215 A1 and published PCT application no. WO2012/175647.

In the example described in US2013/0241215, a strap-type handle is moveable between a stowed state in which its outer surface is flush-mounted with the door skin, and a deployed state in which the handle stands proud of the door skin. The handle is supported at its rear end by a pivotable support mechanism that guides the handle during its movement so that the handle follows a substantially straight path that is perpendicular to the plane of the door. However, since only the rear end of the handle is supported, the handle may exhibit some lateral play which may reduce the ergonomics for the user.

In the general context of retractable door handles, the handles themselves may be movable between the stowed and deployed states mechanically or by electrical means. For example, in a handle arrangement used in some cars, a flush-mounted handle comprises a bar-like handle pivotally attached near one of its ends to a door. In the stowed state the handle lies flush with the door skin and, in the deployed state, the major portion of the handle pivots away from the door skin so that a user can grasp the handle and pull it further into the operative state to unlatch the door. A user moves the handle between the stowed and deployed states simply by pressing the front end of the handle against a spring bias so that the rear portion pivots outwardly. Although this scheme provides a relatively simple mechanical action, it is rather unintuitive to use and requires a two-handed operation which is undesirable.

In contrast, an electrically-actuated scheme is implemented in some other cars. Here, a flush-mounted strap-type handle loop is actuated electrically between a stowed state in which the outer surface of the handle is flush with the door skin and a deployed state in which the outer surface of the handle is spaced from the door skin and so reveals a grab-loop which can be grasped by a user. The handle is moved from the stowed to the deployed state by means of an actuation system which senses the presence of a person next to the door or about to grab the handle and deploys the handle in response. The actuation system may also be configured to command the handle into a deployed state in response to a deployment signal transmitted by a suitable control device, for example, a remote key fob of the vehicle. Although this scheme offers a 'surprise and delight' feature to the user, it requires a relatively complex electrical operating system, which adds weight and cost.

It is desirable to improve the performance and ergonomics of such handle arrangements, and it is against this background that the invention has been devised.

SUMMARY OF THE INVENTION

In an aspect of the invention, there is provided a retractable handle arrangement comprising a handle having a swing-arm moveable about a pivot axis and arranged to couple the handle to a support structure for movement between a stowed state and a deployed state, and wherein the swing arm comprises an engagement means that in the deployed state engages the support structure so as to substantially prevent lateral play of the handle.

A benefit is that by substantially preventing lateral play of the handle, the perception of quality to the user is increased significantly since the handle is likely to vibrate less and also to feel more 'solid' to the user in operation.

In an embodiment the engagement means may comprises first upper and lower location surfaces which, in use, engage with second upper and lower location surfaces located on, or attached to, the support structure, and the engagement means may comprise at least one protrusion extending from the swing arm, and wherein external surfaces of the at least one protrusion define the first upper and lower location surfaces. The protrusion may comprise a stud, which may be comprises a section which has a truncated rectangular pyramidal shape.

In an embodiment the engagement means may comprise a recess on the swing arm, and wherein internal surfaces if the recess define the first upper and lower location surfaces. The inner profile of the recess may have a truncated rectangular pyramidal shape.

The handle can be pivotally coupled to the swing arm so as to be movable from the deployed position to an operable position in which the handle acts to unlatch the door.

In an embodiment the handle arrangement may further comprise a locator for attachment to the support structure and wherein the locator has a recess therein, and wherein the surfaces of the recess define the second upper and lower location surfaces, and in which, in use, the protrusion of the swing arm locates. The recess may have a truncated rectangular pyramidal shape.

In an embodiment the handle arrangement may further comprise a locator for attachment to the support structure and wherein the locator has at least one protrusion thereon, and wherein external surfaces of the at least one protrusion define the second upper and lower location surfaces, which, in use, locate in the recess on the swing arm. The outer profile of the at least one protrusion may comprise a section which has a truncated rectangular pyramidal shape.

The handle arrangement may comprising the support structure to which the handle is mounted.

As will be appreciated from the foregoing, generally the engagement means may comprise a stud provided on the support structure which is engageable with a socket provided on the swing arm, or vice versa the stud defining an outer profile that is shaped to substantially match an inner profile defined by the socket.

In the above embodiments, the stud and socket may be shaped to complement each other so they fit together in a close fit, that is to say that the outer profile of the stud matches the inner profile of the socket. The stud may be frustoconical for example.

In an aspect of the invention, embodiments of this invention comprise a door handle assembly arrangement comprising: a handle that is movable between a stowed state; a deployed state in which, in use, the handle protrudes from the outer surface of a door in which it is mounted; and an operative state in which, in use, the handle is operable to activate a latch associated with said door, wherein a latch release actuator is moveable by the handle through a movement range as the handle moves between the stowed, deployed and operative states. The movement range comprises a lost-motion sub range in which the latch release actuator does not release a latch associated with said door and an active sub range in which the latch release actuator releases a latch associated with said door.

The door handle may be a retractable door handle and, in use, in the stowed state the handle lies substantially flush with an outer surface of the door.

In an embodiment the door latch release actuator cooperates with a door latch link and the door latch release actuator actuates the link only during the active sub-range of the movement range of the actuator.

The active sub-range of movement of the latch release actuator may correlate to movement of the handle between the deployed and operative states.

The link may comprise an electronic switch and movement of the latch release actuator in the active range may actuate said electronic switch. The link may comprise a mechanical link and movement of the latch release actuator in the active range may actuate said mechanical link. The link may comprise a Bowden cable.

A benefit of the invention is that the latch release actuator is able to provide a preload on the handle to prevent it moving dynamically under certain circumstances. Also, it enables the movement of the handle to be given more 'weight', which improves ergonomics for the user.

The door latch release actuator may be configured to actuate the link only during movement of the handle between the deployed and operative states. This limits the 'weighting' of the handle to only the range of movement that the user interacts with the handle.

In one embodiment, the latch release actuator has a link control portion that receives an end of the door latch link. The end of the door latch link may include a retaining feature that is slidably engaged with the link control portion. The latch release actuator may engage with the end of the link slidably, but pull on the link after it has been moved through a predetermined range of movement. The link may include a retaining feature on which the link control portion can grip so as to exert a force on the link and therefore operate the latch. In this way, during movement of the door latch release actuator in the active sub-range, the retaining feature is moved by the link control portion, and wherein during movement of the door latch release actuator in the lost motion sub-range, the retaining feature is slidable with respect to the link control portion. Further, the movement of the door latch release actuator in the sub-range corresponds to movement of the door handle between the deployed and operative states.

The retaining feature may be slidably engaged in a guide slot defined by the link control portion. The guide slot can be arcuate, which complements angular movement of the actuator.

In another embodiment, the latch release actuator includes a drive portion that is cooperable with the link control portion. For example the drive portion may be slidable relative to the link control portion during movement of the handle between the stowed and deployed states, but moves the link control portion during movement of the handle between the deployed and operative states. The drive portion and the link control portion may cooperate by way of a pin and slot arrangement. This may include a pin defined by the drive portion that is slidable in a slot defined by the link control portion. In this embodiment, the actuator is in at least two parts, one of which is driven by the handle and the other of which actuates the link, which may be a more efficient way of operating a cable-pull type arrangement for the door latch.

The door latch release actuator may be biased against movement of the handle from the stowed state to the operative state.

In one embodiment, the door latch release actuator is configured to apply a force to the handle counter to the movement of the handle from the stowed state to the operative state.

In effect, therefore, this 'weights' the movement of the handle, which improves the feel of the handle to the user during operation.

In order for the handle and the door latch release actuator to cooperate, in one embodiment the actuator includes a lever that engages with a control feature on the handle. The lever may remain in contact with the control feature of the handle through the movement of the handle between the stowed and operative state, thereby applying a consistent counterforce to movement of the handle.

Another aspect of the invention provided a retractable door handle arrangement comprising a handle and a linkage that is moveable angularly about a pivot and arranged to couple the handle to a door for movement between a stowed state and a deployed state, wherein the handle is mounted to the linkage and is further movable relative to said linkage between the deployed state and an operative state to unlatch the door. In the stowed state, the handle may lie substantially flush with an outer surface of the door and in the deployed state the handle may protrude from the outer surface of the door.

The handle arrangement provides an ergonomic benefit to the user, since the arrangement has is very space efficient within what can be in vehicular applications a very tight door width, while still permitting a useful range of movement of the handle.

The relative movement between the handle and the linkage may comprise substantially translational movement. Alternatively the relative movement between the handle and the linkage comprises substantially arcuate movement.

The handle arrangement may comprise one or more guide means configured to guide the handle as it moves between the deployed and the operative states. The guide means may comprise one or more linear or arcuate guides.

In one embodiment the guide means may comprise a first guide slot in the handle which constrains movement of the handle relative to the linkage and the linkage may comprise a guide pin received within with the first guide slot. The guide means may further comprise a second guide slot that is spaced from, and is oriented substantially parallel to, or concentric with, the first guide slot and the linkage may include first and second guide pins received within the respective first and second guide slots. Alternatively the slots and pins may be in the opposite orientation such that the guide means may comprise a first guide slot and second guide slot in the linkage, the second guide slot being spaced from and oriented substantially parallel to or concentric with the first guide slot, and which said first and second guide slots constrain movement of the handle relative to the linkage. The handle may include first and second guide rods or pins received within the respective first and second guide slots In another embodiment the guide means may include a telescopic mechanism defined in part by the handle and in part by the linkage. The guide means may comprise the linkage being provided with one or more guide rods with which the handle cooperates for guiding movement thereof between the deployed and operative states and the handle may be provided with one or more guide rod receivers for cooperating with a respective rod of the linkage. Alternatively the guide means may comprise the handle being provided with one or more guide rods with which the linkage cooperates for guiding movement of the handle between the deployed and operative states and the linkage may be provided with one or more guide rod receivers for cooperating with a respective guide rod of the handle.

The handle may be spring biased from the operative state to the deployed state.

In another embodiment the handle may be mounted to the linkage at a pivot. The pivot may include a torsion spring for biasing the handle from the operative state to the deployed state. In one arrangement the handle has first and second ends, and the first end of the handle is pivotably mounted to the linkage and the second end of the handle is configured to operate a door unlatch mechanism.

The invention also resides in a body component for a vehicle comprising an outer surface defining an aperture for receiving the handle of the retractable handle arrangement as described above, wherein the handle substantially fills the aperture, i.e. it is received therein as a close fit and the outer surface of the handle is shaped to match and to lie substantially flush with the outer surface of the panel when the handle is in a stowed position or state. In the stowed state the handle may lie substantially flush with the outer surface of the panel and in the deployed state in which the handle may protrude from the outer surface of the panel. The body panel may comprise a vehicle door.

The invention also resides in a vehicle including the body component or the retractable handle arrangement as herein described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF EMBODIMENTS

Specific embodiments of the invention will now be described in which numerous features will be discussed in detail in order to provide a thorough understanding of the inventive concept as defined in the claims. However, it will be apparent to the skilled person that the invention may be put into effect without the specific details or that variations may be made to those specific features in question. In some instances, well-known method, techniques and structures have not been described in detail in order not to obscure the invention unnecessarily.

Figure 1:
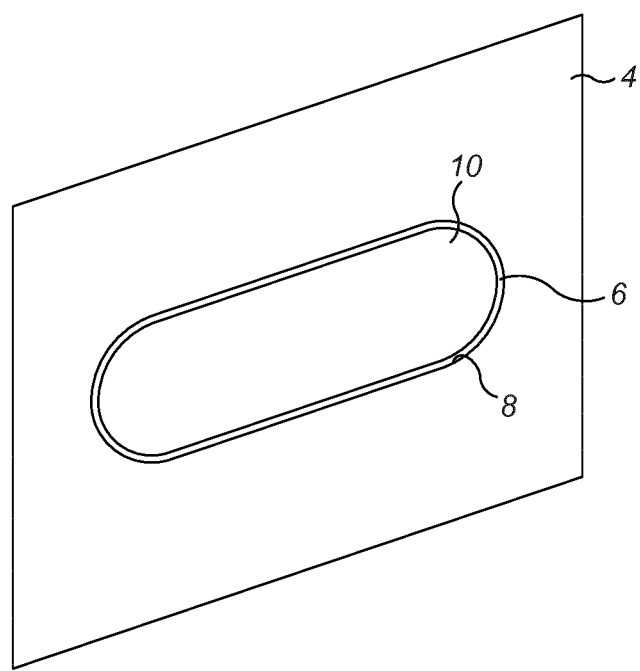
FIG. 1 is a perspective view of a vehicle door panel equipped with a retractable handle arrangement, that is shown in a stowed state, in accordance with an embodiment of the invention.

Referring to FIG. 1, a door handle arrangement 2 of an embodiment of the invention is retractable with respect to a door of a vehicle, the door being considered to be a body component for the purposes of this specification. An outer surface or 'door skin' 4 is shown here as representing the door. The door handle arrangement 2 includes a handle 6 that is substantially flush-mounted with respect to the door skin 4 when the handle 6 is in a stowed state, as shown here. The handle 6 is operable to transition from the stowed state to a deployed state in which it protrudes from the door skin 4 so that it can be grasped by a user, as will be described.

The door skin 4 is penetrated by a horizontally-extending aperture 8, hereinafter 'slot', that receives the handle 6 in a close fit. The outer surface 10 of the handle 6 is shaped to match that of the slot 8 and lies flush with the surrounding surface of the door skin 4 when the handle is stowed as in FIG. 1. The shape of the slot 8 and the outer surface 10 of the handle 6 is chosen largely for aesthetic reasons and is immaterial in terms of function.

Although in FIG. 1 only the outer surface 10 of the handle 6 can be seen, the remaining Figures show the handle arrangement 2 in more detail.

The retractable handle arrangement 2 comprises a drive means/arrangement 12 which is operable to move the handle 6 between the stowed state and a deployed state as will be described in detail. The drive arrangement 12 is electrically operated and is shown here largely in schematic form as comprising an electrical drive unit 14, such as a motor or solenoid, that is operable to drive a spindle 16 on which the handle 6 is mounted. It is envisaged that the drive unit 14 may act on the spindle 16 through a suitable worm gear or rack and pinion (not shown) in order to provide fine positioning control of the spindle 16 and, thus, of the handle 6. It should be noted that the drive arrangement 12 depicted here represents one way in which the handle 6 may be moved angularly between its stowed and deployed states and that other ways would be apparent to the skilled person, for example the electrically-driven handle deployment mechanisms as described in the applicant's co-pending patent applications US2013/0241215 and WO2012/175647, the contents of which are incorporated herein by reference.

In more detail, the handle 6 is an elongate member having first and second ends 20, 22. A pivot 24 is disposed at the first end 22 of the handle 6 by which the handle 6 is coupled or mounted to a handle support structure 25 and cooperates with the drive arrangement 12 in order to allow the handle 6 to move angularly with respect to the slot 8 between stowed and deployed states. A handle loop 26 defined at the second end 20 of the handle 6 is linked to the pivot by a swing arm 27. The swing arm 27 itself is pivotably connected to the handle loop 26 at a second pivot 29.

Figure 2:
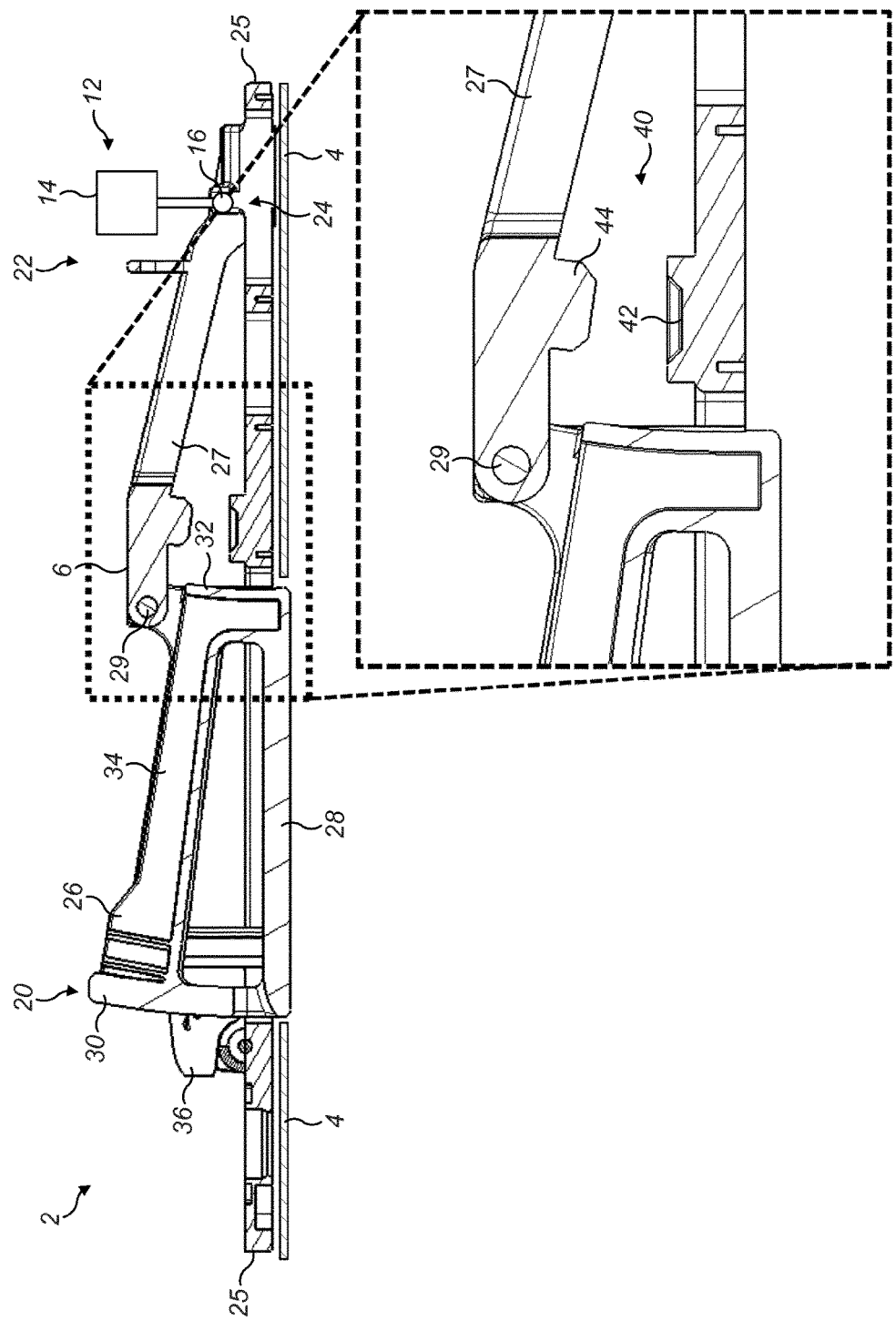
FIG. 2 is a view from above of the handle arrangement in FIG. 1 also in the stowed state, and an inset panel shows an enlarged portion of the handle arrangement.

The handle loop 26 provides a handgrip 28 that defines the outer surface 10, with end pieces 30, 32 at opposed ends spacing the handgrip 28 from an inner member 34 that is shaped like the handgrip 28 so as to fill the slot 8 when the handle is deployed, as shown in FIG. 2.

The end pieces 30, 32 are generally parallel to each other and are slightly curved in plan view. Together, the handgrip 28, end pieces 30, 32 and the inner member 34 form an approximate truncated wedge shape, such a shape again being determined mainly for aesthetic reasons.

Figure 3:
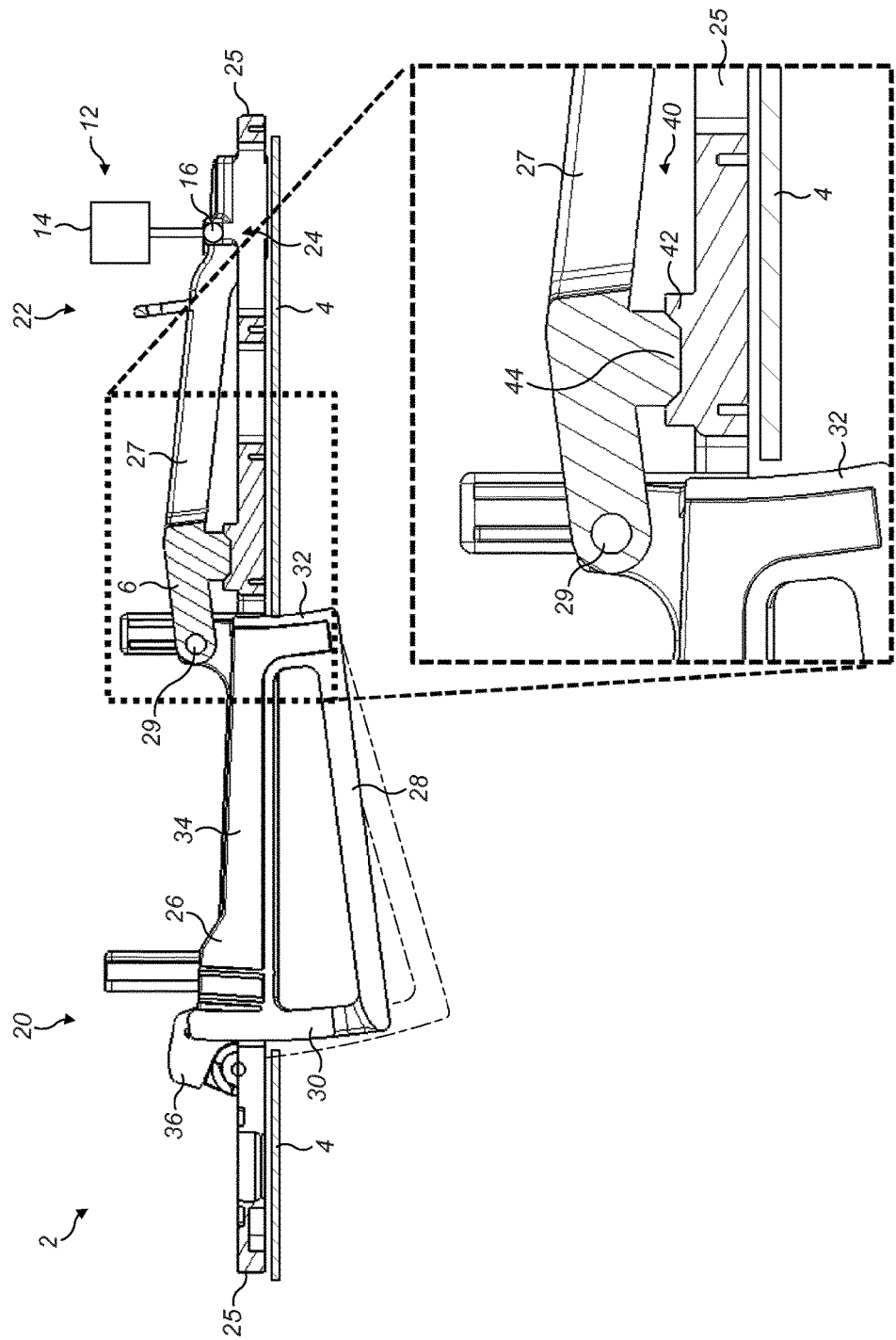
FIG. 3 shows the same view as in FIG. 2, but in which the handle arrangement is in a deployed state.

Whereas FIG. 2 shows the handle 6 in the stowed state, FIG. 3 shows the handle as deployed, in which the handgrip 28 has popped out of the slot 8 so as to stand proud of the surrounding door skin 4. This reveals the handle loop 26 so that the user can grasp the handgrip 28 and move the handle 6 angularly against a spring bias (not shown) to pull the handle arrangement 2 into an operative state so as to unlatch the door.

When grasping the handgrip 28 to pull the handle 6, the user's fingers and possibly also the thumb can extend between the handgrip 28 and the inner member 34. Since the loop 26 is open from the top and bottom, this allows the user to approach the handle 6 with an overhand or an underhand grip, whichever is more comfortable.

The handle 6 may be driven by the drive arrangement 12 from its stowed state to its deployed state in response to various events. For example, this movement may be in response to an unlocking signal from a key authorised to unlock the vehicle or from a proximity sensor that detects the presence of an authorised key in the immediate vicinity of the vehicle. Conversely, the handle 6 may be driven from the deployed to the stowed state in response to a locking signal from a key authorised to lock the vehicle or from a proximity sensor that determines that the authorised key has left the immediate vicinity of the vehicle, or that the vehicle moves off. Alternatively, the handle 6 may toggle between the stowed and deployed states in response to different user actions, for example the user may press and lock/unlock switch (not shown) somewhere in the vehicle door.

Once in the deployed state, the handle 6 can then be pulled to open the door, which involves the user moving the handle 6 such that it moves angularly about the second pivot 29 further outwardly against a spring bias into the operative state, as shown in dashed lines. Although not shown here, the spring bias may be provided between the swing arm 27 and the handle loop 26. A torsion spring at the pivot 29 would be suitable, although the skilled person would conceive of other ways a spring bias could be provided.

In moving from the deployed to the operative state, the handle 6 may unlatch the door mechanically or electrically, such means being generally known in the art and so are not disclosed here in detail. For example, to unlatch the door mechanically, the handle 6 may be provided with a suitable linkage 36 that is cooperable with a Bowden cable (not shown) that acts on the door latch (not shown) in a well-known manner. Alternatively, the door handle 6 may be configured to cooperate with a limit switch such that in the operative state the limit switch is triggered so as to send a door opening signal to a body control module (BCM) of the vehicle which then electronically commands the relevant door to be unlatched. Such a mechanism is also known to the skilled person and so is not described in detail here.

The discussion above has focussed on the movement of the handle 6 as it transitions from its stowed state, in which it lies substantially flush with the door skin 4, to the deployed state, in which it is driven by the drive unit 14 to protrude from the door, whereby the handle 6 is then able to be moved through a further range of movement into the operative state so as to unlatch the door. Such a handle arrangement 2 has several advantages, for example its substantially flush profile when stowed which helps to meet legislation governing exterior projections on vehicles and also promotes clean airflow over the door. However, the way in which the handle 6 is pivotably supported may mean that the handle 6 exhibits some lateral play in a direction perpendicular to the plane of movement of the handle. This lateral play will be felt by a user when grasping the handle and may reduce the perceived quality of the handle arrangement, which is particularly undesirable in the context of premium vehicles.

One option may be to provide a more complex guiding structure that guides the handle as it moves angularly in the door panel so as to restrict its lateral play. However, increasing the complexity of the handle arrangement in this way would have a corresponding increase in weight and cost and may also reduce the reliability of the unit, making it an undesirable solution.

However, the handle arrangement 2 of the invention provides an elegant solution that substantially prevents the lateral play in the handle when in the deployed state and therefore steadies the handle 6 as it is moved by a user between the deployed and operative states. The term "substantially prevents" is intended to mean that lateral play or "loose" movement of the handle is much reduced compared to existing handle designs. Although it will be understood that a that total elimination of all lateral play would be desirable it is acknowledged that this may not be possible in practice and so the term "substantially prevent" is intended to cover a scenario where a very small degree of lateral play still exists, but which would not adversely affect the perception of quality by a user. Here, the term lateral play is meant in the sense of a small movement of the handle in a direction that is transverse or even perpendicular to the normal movement of the handle when moving between stowed and deployed states.

In this embodiment, the handle arrangement includes engagement means 40 comprising two components; a first engagement part 42 is defined by the support structure 25 and a second engagement part 44 is defined by the swing arm 27. The a first engagement 42 and a second engagement part have 44 have corresponding upper and lower location surfaces that abut one another when the handle is in the deployed position.

In this embodiment, the first engagement part 42 is a cup or socket and the second engagement part 44 is a projection or stud that is shaped so as to be engageable with the socket 42. Alternative embodiments are envisaged where the stud 44 is defined by the support structure 25 and the socket 42 is defined by the swing arm 27.

In FIG. 2, the handle 6 is in a stowed state and, here the stud 44 is spaced from the socket 42. However, in FIG. 3, the handle 6 has moved into the deployed state and it can be seen here that the stud 44 has located into the socket 42.

The stud 44 and the socket 44 are complementary shaped such that the stud 44 fits into the socket 42 in a close fit and so that the socket 42 supports the stud 44 and prevents it moving in a direction that is perpendicular to the plane of movement of the swing arm 27 as it moves angularly between the stowed and deployed states.

Figure 4A:
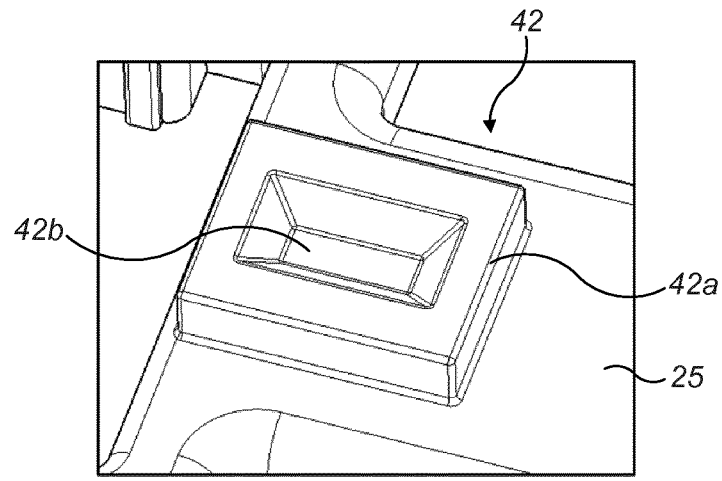
FIGS. 4a and 4b show complementary features of engagement means of the handle arrangement.
Figure 4B:
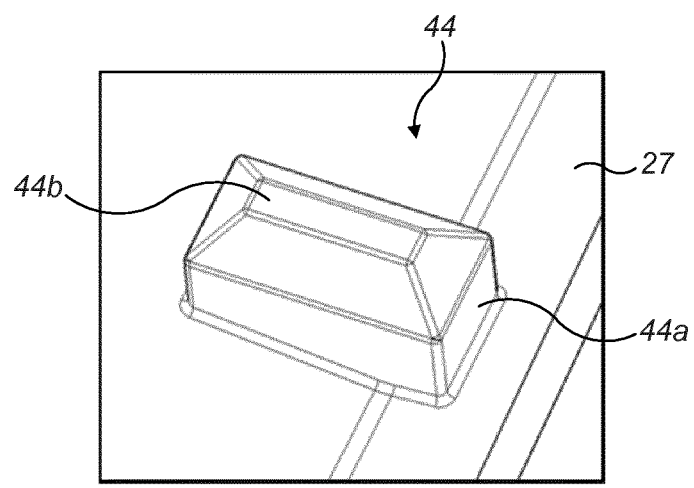

In this embodiment, and as can be seen particularly well in FIGS. 4a and 4b, the stud 44 has an outer profile being defined by a substantially rectangular base portion 44a and an upper portion 44b having a generally truncated rectangular pyramidal shape.

In a similar way, socket 42 is shaped to define an inner profile that matches the upper portion 44b of the stud. Thus, the socket 42 includes an upstanding block-like platform 42a whereby a generally truncated rectangular pyramidal recess 42b is defined at a central position on the upper surface of the platform 42a. The recess 42b has dimensions that match the upper portion of the stud 44b so as to define a close fit with it.

One benefit of the inclined side walls of the stud 44 and the socket 42 resulting from the truncated pyramid-like profiles is that as the stud 44 approaches the socket 42, a slight misalignment of the two components is accommodated and the inclined surfaces guide the stud 44 into position in the socket 42.

The skilled person will appreciate that various modifications may be made to the illustrated embodiments without departing from the inventive concept as defined by the claims.

For example, although the above embodiments have been described as including a stud and socket having a rectangular profile, it should be appreciated that this is not essential and that the stud and socket could have a different shape, for example they could be shaped as frustums of any polygonal based pyramid or a circular or oval based cone. Accordingly, any suitable shape would be appropriate as long as lateral play between the handle and the support structure is substantially prevented, and might be eliminated, when the handle is in the deployed state.

This description will now discuss alternative handle arrangements with reference to FIG. 5 to FIGS. 14a to c.

Figure 5:
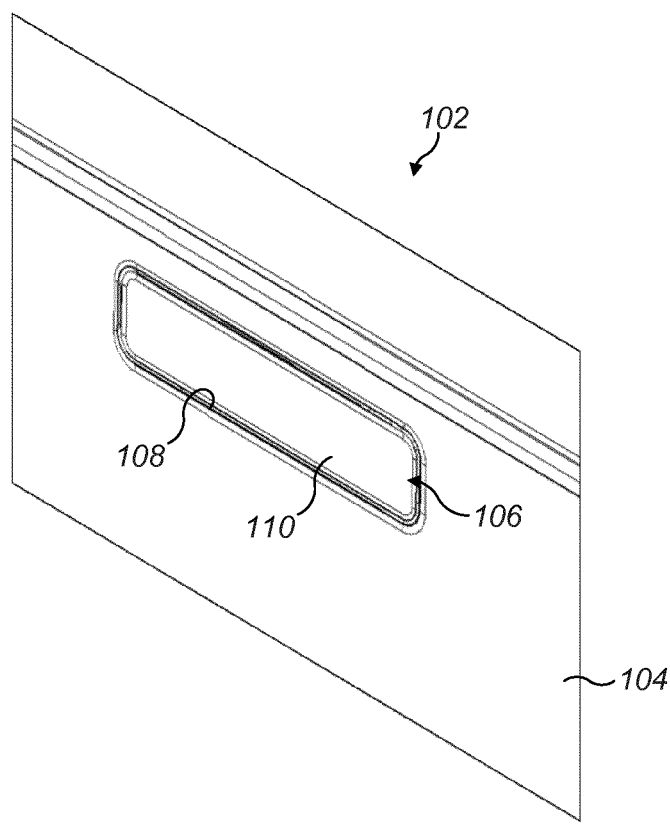
FIG. 5 is a perspective view of a vehicle door panel equipped with a retractable handle arrangement, that is shown in a stowed state, in accordance with another embodiment of the invention.

Referring to FIG. 5, a door handle arrangement 102 of an embodiment of the invention is retractable with respect to a door of a vehicle. An outer surface or 'door skin' 104 is shown here as representing the door, which can be considered to be a body component of the vehicle, although it may not be an openable panel of the vehicle. The door handle arrangement 102 includes a handle 106 that is substantially flush-mounted with respect to the door skin 104 when the handle 106 is in a stowed state or position, as shown here. The handle 106 is operable to transition from the stowed state to a deployed state or position in which it protrudes from the door skin 104 so that it can be grasped by a user, as will be described.

The door skin 104 is penetrated by a horizontally-extending aperture 108, hereinafter 'slot' that receives the handle 106 in a close fit. The outer surface 110 of the handle 106 is shaped to complement or match the shape of the slot 108 and lies flush with the surrounding surface of the door skin 104 when the handle is stowed as in FIG. 5. The shape of the slot 108 and the outer surface 110 of the handle 106 is chosen largely for aesthetic reasons and it will be appreciated that different shaped handles and slots may be used.

Although in FIG. 5 only the outer surface 110 of the handle 106 can be seen, FIGS. 6-14a-c show the handle arrangement 102 in more detail.

The retractable handle arrangement 102 comprises a drive means/arrangement 112 which is operable to move the handle 106 between the stowed state and a deployed state as will be described in detail. The drive arrangement 112 is electrically operated and is shown here largely in schematic form as comprising an electrical drive unit 114, such as a motor or solenoid, that is operable to drive a spindle 116 to which the handle 106 is operatively connected via a primary linkage or swing arm 127. It is envisaged that the drive unit 114 may act on the spindle 116 through a suitable worm gear or rack and pinion (not shown) in order to provide fine positioning control of the spindle 116 and, thus, of the handle 106. It should be noted that the drive arrangement 112 depicted here represents one way in which the handle 106 may be moved angularly between its stowed and deployed states and that other ways would be apparent to the skilled person, for example the electrically-driven handle deployment mechanisms as described in the applicant's co-pending patent applications US2013/0241215 and WO2012/175647, the contents of which are incorporated herein by reference.

In more detail, the handle 106 is a 'strap'-type handle in that it defines a loop. The loop provides a handgrip 128 that defines the outer surface 110 of the handle 106, with end pieces 130, 132 at opposed ends spacing the handgrip 128 from an inner member 134 that is shaped like the handgrip 128 so as to fill the slot 108 when the handle is deployed, as shown in FIG. 6c.

The end pieces 130, 132 are generally parallel to each other and are slightly curved in plan view. Together, the handgrip 128, end pieces 130, 132 and the inner member 134 form an approximate truncated wedge shape, such a shape again being determined mainly for aesthetic reasons.

The swing arm 127 couples the handle 106 to a support structure 125 at a pivot 124 and cooperates with the drive arrangement 112 in order to allow the handle 106 to move angularly with respect to the slot 108 between stowed and deployed states. The spindle 116 thus defines a primary pivot axis at pivot 124. The handle 106 is coupled to the swing arm 127 at a second pivot 129.

Figure 6A:
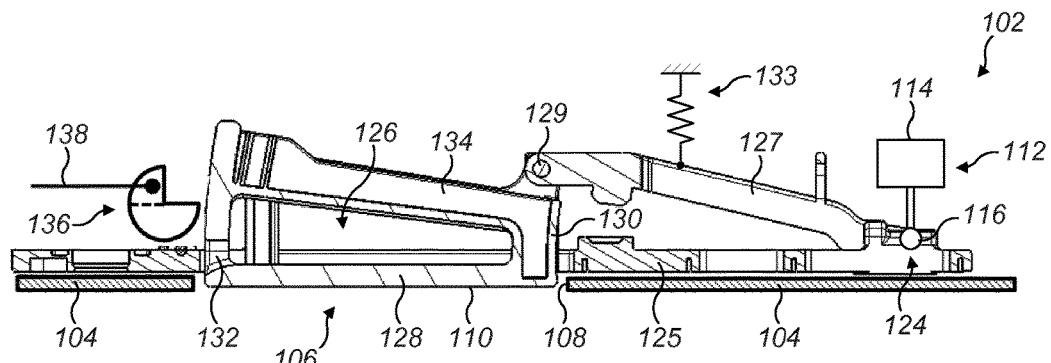
FIGS. 6a, 6b and 6c are a sequence of top sectional views of the door and handle arrangement of FIG. 5, with the door handle being shown respectively in stowed, deployed and operative states.
Figure 6B:
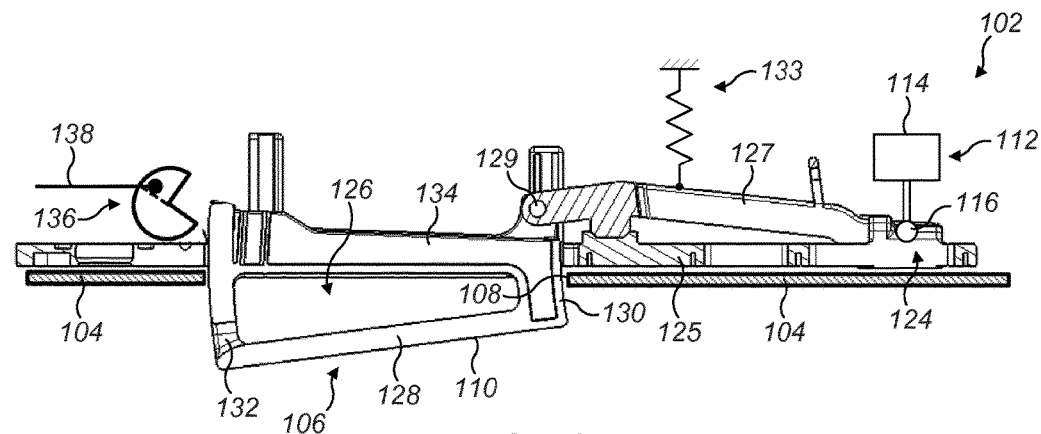
Figure 6C:
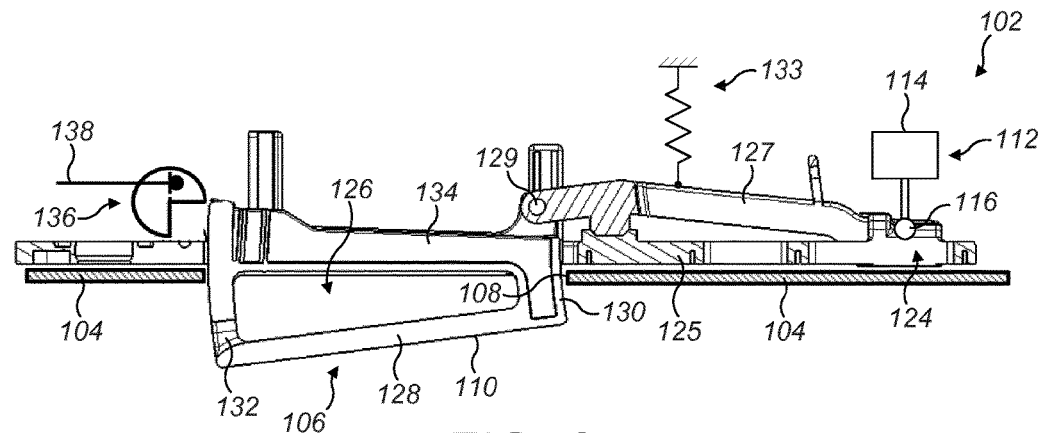

Whereas FIG. 6a shows the handle 106 in the stowed state, such that the handle surface is substantially flush with the door skin 104, FIG. 6b shows the handle as deployed, in which the handgrip 128 has popped out of the slot 108 so as to stand proud of the surrounding door skin 104. This reveals the handle 106 so that the user can grasp the handgrip 128 and move the handle 106 angularly against a spring bias 133 to pull the handle arrangement 102 into an operative state so as to unlatch the door, as will be described.

When grasping the handgrip 128 to pull the handle 106, the user's fingers and possibly also the thumb can extend between the handgrip 128 and the inner member 134. Since the loop 126 is open from the top and bottom, this allows the user to approach the handle 106 with an overhand or an underhand grip, whichever is more comfortable.

The handle 106 may be driven by the drive arrangement 112 from its stowed state to its deployed state in response to various events. For example, this movement may be in response to an unlocking signal from a key authorised to unlock the vehicle or from a proximity sensor that detects the presence of an authorised key in the immediate vicinity of the vehicle. Conversely, the handle 106 may be driven from the deployed to the stowed state in response to a locking signal from a key authorised to lock the vehicle or from a proximity sensor that determines that the authorised key has left the immediate vicinity of the vehicle. Alternatively, the handle 106 may toggle between the stowed and deployed states in response to different user actions, for example the user may press and lock/unlock switch (not shown) somewhere in the vehicle door. Alternatively the handles may move from the deployed state to the stowed state in response to a different action, for example the car commencing to move.

Once in the deployed state, the handle 106 can then be pulled to open the door, which involves the user moving the handle 106 such that it moves angularly about the second pivot 129 further outwardly against spring bias into the operative state, as shown in FIG. 6c.

In moving from the deployed to the operative state, the handle arrangement 102 is configured to unlatch the door and, to this end, is provided with a door latch release actuator 136 that cooperates with a link 138, shown here as a Bowden cable, that pulls on the door latch so as to open the door. Although a mechanical arrangement like this is proposed, it is also envisaged that the link may be configured to act on an electronic opening mechanism. Also, instead of a flexible link such as a Bowden cable, more rigid links are also envisaged.

The door latch release actuator 36 is shown schematically in FIGS. 6a, 6b and 6c and will be described in more detail later. However, a brief overview of its operation will now be provided.

During movement of the handle between the stowed, deployed, and operative states, it is important that the door is only unlatched as the handle moves to the operative state. This can be seen by comparing FIGS. 6a-6c. In FIG. 6a, the door latch release actuator 136 is in a first position in which it does not exert significant tension on the link 138 so that the door does not unlatch.

As the handle 106 moves into the deployed position, as shown in FIG. 6b, the door latch release actuator 136 moves angularly with the handle 106. However, during this range of angular movement no tension is applied to the Bowden cable 138. The Bowden cable 138 is therefore allowed a predetermined degree of 'free play' during handle movement between the stowed and the deployed position, even though the actuator 136 rotates.

FIG. 6c shows the handle 106 moved into its final, operative, state in which the door it unlatched. The handle 106 moves into this state by pivoting about the swing arm 127 at second pivot 129 that is located at end piece 130 of the handle 106 and so rotatably couples that end of the handle 106 to the distal end of the swing arm 127.

As can be seen, this movement of the handle 106 causes the door latch release actuator 136 to be rotated further in a clockwise direction compared to the position in FIG. 6b. During this section of rotating movement, the actuator 136 'picks up' the link 138 thereby applying tension thereto in order to trigger the door latch. As is shown, the Bowden cable 138 is moved to the right in this Figure.

So, in summary, the Bowden cable 138 is actuated by the door latch release actuator 136 only during movement of the handle 106 between the deployed and operative states, but not during movement of the handle between the stowed and deployed states.

The advantage of this is that a relatively simple mechanism provides the flexibility to be coupled to the handle during the whole range of its movement, but to cause movement of the link only during a portion of that movement. Combined with a suitable counter-bias of the door latch release actuator 136, this provides a sense of perceived quality of the handle movement to a user. A further benefit is that it puts a preload on the handle to guard against the handle moving dynamically in use, for example due to vibration or in severe manoeuvers.

Although the door latch release actuator 136 has been described broadly in the above discussion, the structure of the illustrated embodiment will now be explained more fully with reference to the remaining figures.

Figure 7A:
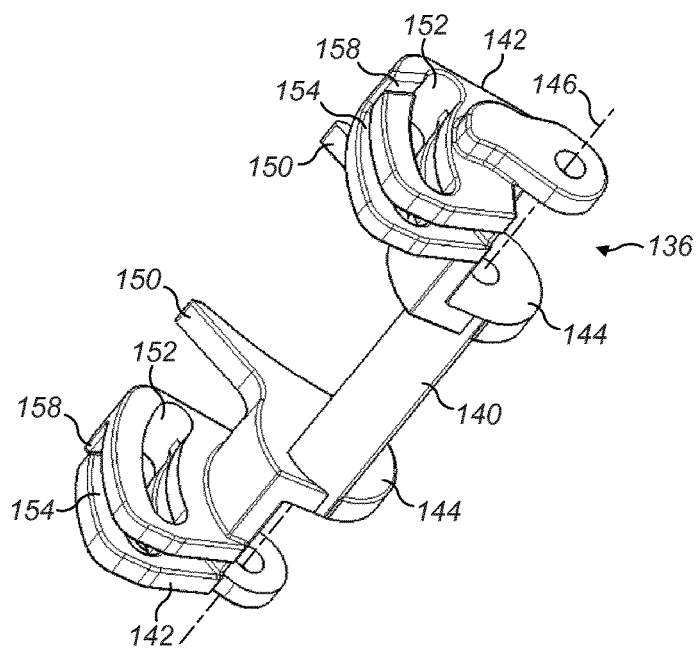
FIGS. 7a, 7b and 7c are views from various perspectives of a door latch release actuator of the handle arrangement in FIGS. 6a-c.
Figure 7B:
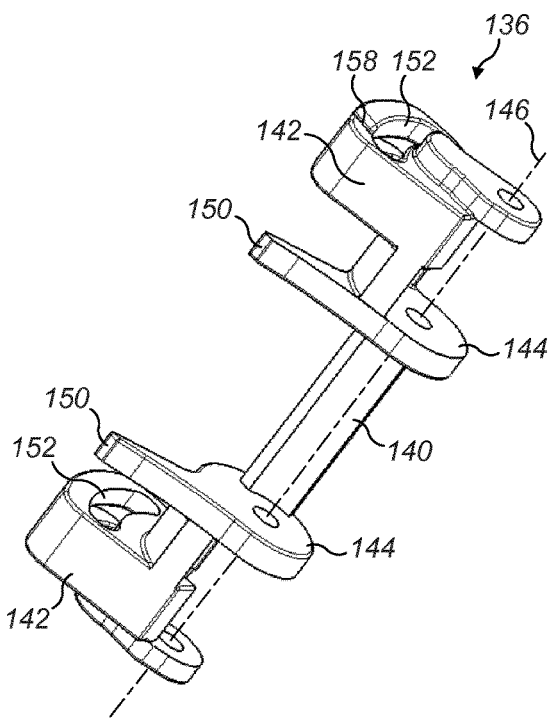
Figure 7C:
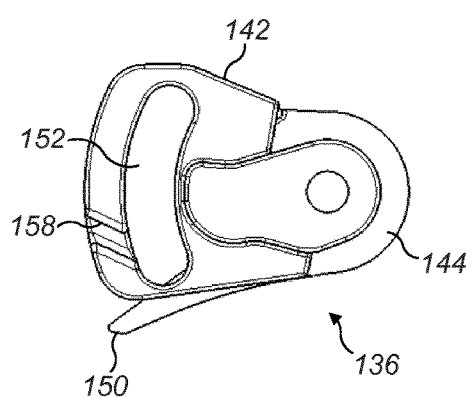

Referring to FIGS. 7a, 7b and 7c, in which the door latch release actuator 136 (hereinafter simply 'actuator') is shown in isolation from the handle arrangement, it will be seen that it has a generally elongate structure defined by a central yoke 140 each end of which supports a respective link control portion 142. As will be described, the link control portions 142 cooperate with the Bowden cable 138 in order to control the door latch mechanism (not shown) in the door. Note that only one of the link control portions 142 is engaged with the Bowden cable. However, the actuator 136 includes two link control portions 142 to eliminate 'handedness' of the part, i.e. to enable to same part to be used for different sides of the car.

Figure 12:
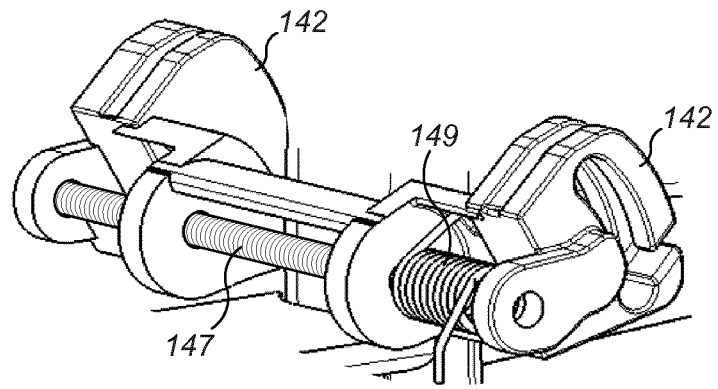
FIG. 12 is a perspective view of the release actuator that shows a biasing arrangement.

Although not shown in detail here, it should be noted that the actuator 136 is rotatably supported by the support structure 125 of the handle arrangement. Specifically, the central yoke is shaped to define a mounting bracket 144 which defines a pivot axis 146 of the actuator 136. Note that a support rod 147 to which the actuator 136 is mounted is shown in FIG. 12. As is also shown in FIG. 12, the support rod 147 carries a bias means 149 in the form of a coil spring which acts to reverse bias the actuator 136.

The central yoke 140 also supports or defines a pair of actuating levers 150 that are spaced apart along the yoke 140 and generally parallel to one another. Here, the levers 150 are shown extending away from the central yoke 140 generally in the same direction as the link control portions 142. As will be seen, the spaced apart positioning of the actuating levers 150 enables them to span the width of the handle 106 so as to accommodate the handle between the levers 150. Each of the levers 150 is thus able to engage a control feature, in the form of a pin 151 (shown in FIG. 8a, for example), on the handle 106 which serves to move the actuator 136 about the pivot axis 146 in accordance with movement of the handle 106 from the stowed, deployed and operative states.

Each link control portion 142 has the same structure but are mirror images of one another due to their positioning at each end of the central yoke 140. Reference will be made to a single link control portion 142, but it should be appreciated that the description applies to both.

The link control portion 142 is lobe-like in shape in that has the structure of a rounded projection that extends in a plane normal to the pivot axis of the central yoke 140. The function of the link control portion 142 is to pull on the Bowden cable 138. To this end, therefore, the link control portion 142 defines two features: a guide slot 152 and a link passage 154.

Figure 8A:
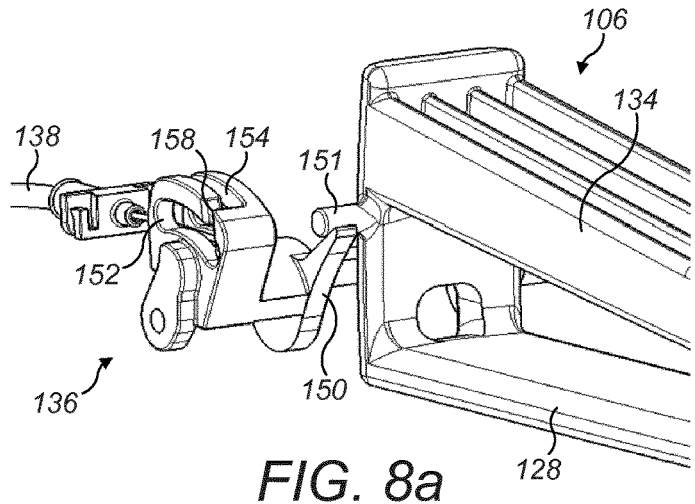
FIGS. 8a and 8b are perspective and top views, respectively, of the handle and door latch release actuator of FIGS. 6a-c and FIGS. 7a-c in the stowed state.
Figure 8B:
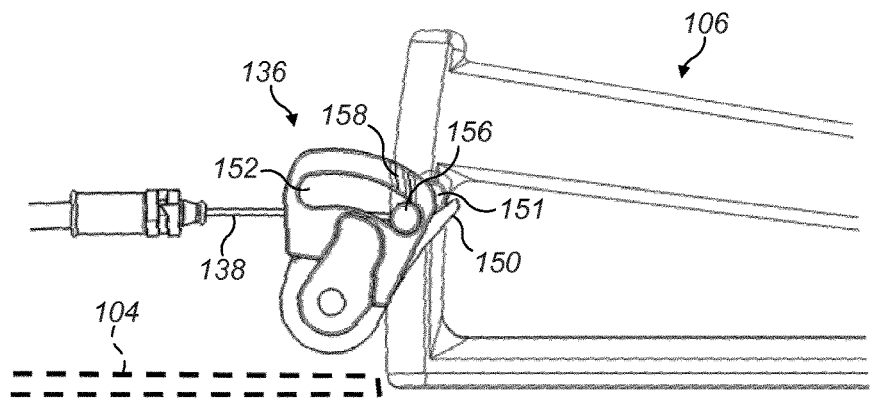

The guide slot 152 extends laterally through the link control portion 142 and is shaped to receive and guide a retaining feature in the form of an end nipple 156 of the Bowden cable 138 (shown in FIG. 8b, for example). An access hole 158 is provided in the guide slot 152 so that the Bowden cable 138 can be passed through the hole 158 in order to locate the nipple 156 in the guide slot 152. In this embodiment the guide slot 152 is curved or arcuate which helps to maintain a constant tension on the cable when it is pulled, although this is not essential.

The link passage 154 extends radially along the plane of the link control portion 142 and partially breaks the link control portion 142 into adjacent parallel pieces. The link passage 154 provides a channel to allow the Bowden cable 138 to pass through it as the actuator 136 is rotated by the handle 106, as will become apparent.

The guide slot 152 is elongate and allows the nipple 156 of the Bowden cable 138 to slide along it between its two ends. This allows the actuator 136 a degree of free play with respect to the Bowden cable 138. The effect of this, as will be explained, is that the actuator 136 only pulls on the Bowden cable as the handle 106 moves from the deployed state to the operative state. However, the actuator 136 is still moved with the handle 106 as it moves from the stowed to the deployed state although it does not tension the Bowden cable 138 during this range of movement. Usefully, however, the counter bias of the actuator 136 applies a force to the handle counter to its outward movement. This counter force imparts a feeling of solidity to the user when they operate the handle, therefore providing a sense of quality which is important particularly in the premium vehicle market.

Having described the function of the door latch release actuator 136 in broad terms above, it will now be described in more detail with reference to FIGS. 8a, 8b, 9, 10a, 10b and 11a,11b. As will be seen the door latch release actuator 136 is moved by the handle 106 through a range of movement that corresponds to movement of the handle 106 between the stowed state and operative state. However, the actuator 136 is configured to actuate the Bowden cable/link 138 only during a sub-range of that range of movement.

FIGS. 8a and 8b show the handle 106 in a stowed state, as is also shown in FIG. 6a. Here, the actuator levers 150 are inclined upwardly and the control pin 151 of the handle is engaged with the tip of the actuator lever 150. A pair of levers 150 are provided to ensure that the actuator 136 is 'non-handed' and, as such, the same part can be used on both sides of the vehicle.

In this position the end nipple 156 of the Bowden cable 138 is located at the end of the guide slot proximate to the handle 106. To allow for the linear pull arrangement, the Bowden cable passes through the link channel.

Figure 9:
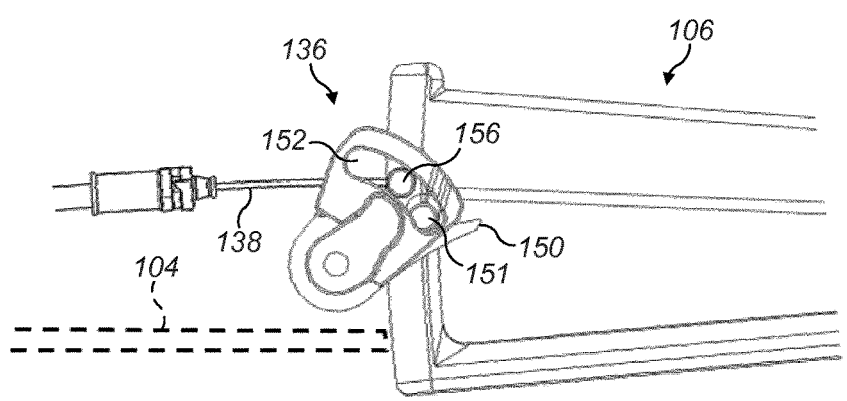
FIG. 9 is a top view of the handle and door latch release actuator of FIGS. 8a and 8b in an intermediate position between the stowed and deployed states.

FIG. 9 shows the handle 106 moved into an intermediate position between the stowed and deployed states. Here it will be appreciated that the actuator 136 has rotated angularly in a clockwise direction as driven by the outward movement of the handle 106. The handle 106 has caused the movement of the actuator 136 by the control pin 151 driving the actuator lever 150 in a clockwise direction and it will be noted that the control pin 151 has shifted slightly along the lever 150 from its original position near to the tip to near to the middle of the length of the lever 150.

At this intermediate point of travel, the end nipple 156 of the Bowden cable 138 has shifted along the guide slot 152 as the actuator 136 has moved and so it now occupies an approximate mid position within the guide slot 152. Since the end nipple 156 is free to move forwards and backwards within the guide slot 152, no tension can be put on the Bowden cable 138 so the door latch will not be triggered.

Figure 10A:
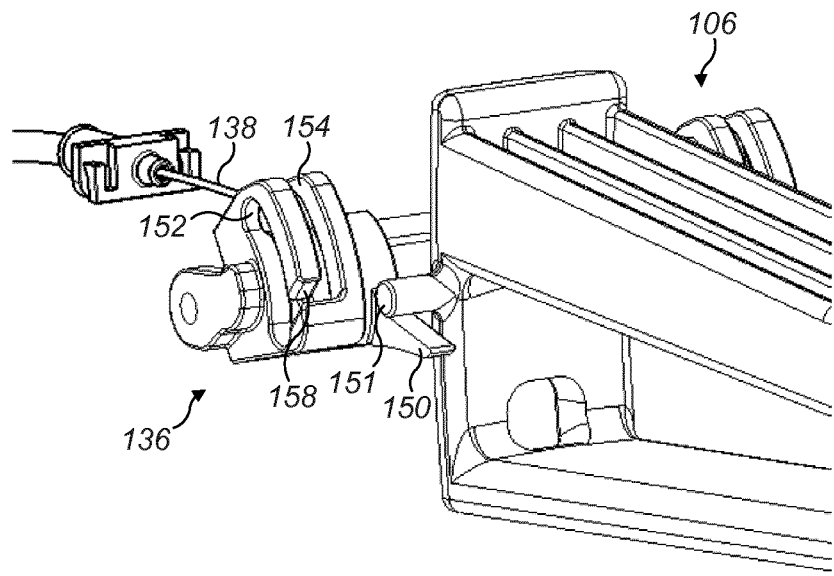
FIGS. 10a and 10b are perspective and top views, respectively, of the handle and door latch release actuator FIGS. 8a and 8b in the deployed state.
Figure 10B:
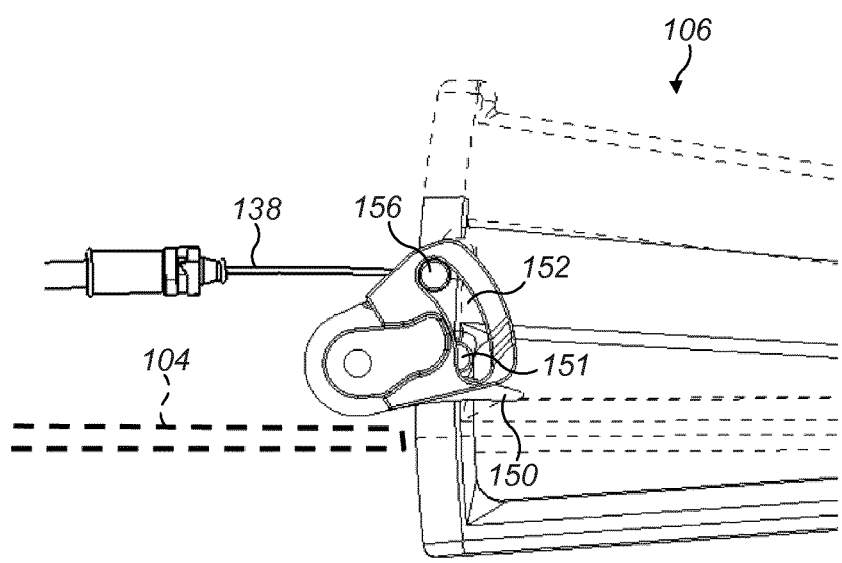

FIGS. 10a and 10b show the handle 106 having been moved further from the FIG. 9 position into the deployed state. Notable here is that the end nipple 156 of the Bowden cable 138 now occupies the second end of the guide slot 152 and so no further free play is permitted. Any further movement of the handle 106 will cause the actuator 136 to pull on the Bowden cable 138. Also, the control pin 151 has shifted further down the lever 150 so that it now rests at a base part of the lever 150. The length of the lever 150 therefore accommodates the angular path taken by the control pin 151.

Figure 11A:
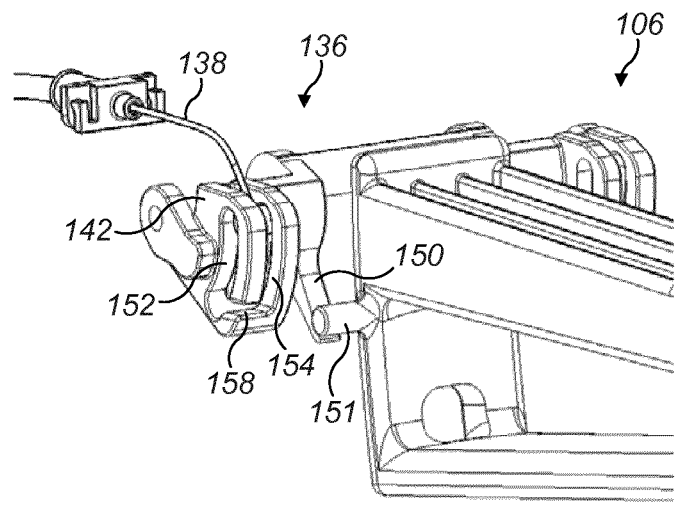
FIGS. 11a and 11b are perspective and top views, respectively of the handle and door latch release actuator FIGS. 8a and 8b in the operative state.
Figure 11B:
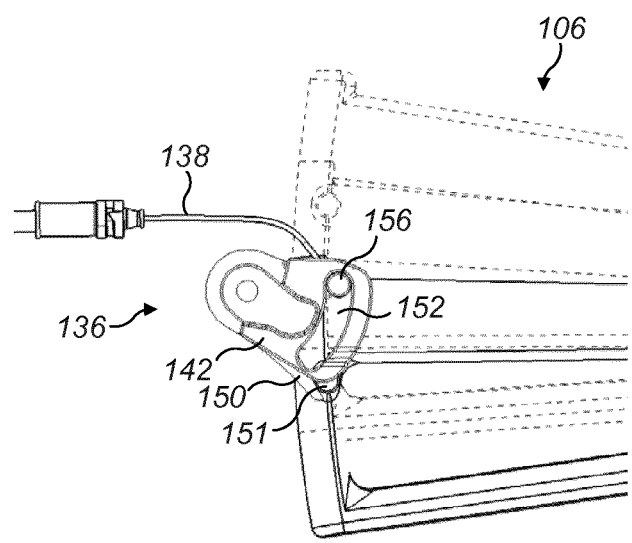

FIGS. 11a and 11b show the handle 106 in the operative state, and it will be noted that previous handle positions are indicated by dashed lines in FIG. 11b. In this state, the end nipple 156 of the Bowden cable 138 is still at the second end of the guide slot 152 such that clockwise movement of the actuator 136, and therefore the link control portion 142, has pulled the Bowden cable 138 so as to unlatch the door. The control pin 151 of the handle 106 has shifted back down the lever again to its tip, and so the lever 150 still applies a counter bias force on the handle 106 back into its deployed position such that the handle will return to the deployed state when the user releases the handle.

The skilled person would understand that various modifications may be made to the above embodiments without departing from the scope of the invention as defined by the claims.

For example, in the illustrated embodiment, the Bowden cable 138 has an end nipple 156 that is slidable in the slot 152 defined in the control portion 142 of the actuator 136. As has been discussed, the length of the slot 152 allows the actuator 136 to rotate by a predetermined amount until the end nipple 156 reaches the end of the slot 152 such that further movement of the actuator pulls on the Bowden cable 138. However, in some circumstances it may be undesirable to have a cable sliding through a part of the actuator in this way because it might be possible for the movement to be affected by debris, although such an occurrence is considered unlikely. With this in mind, FIG. 13 and FIGS. 14a, 14b and 14c show an alternative embodiment, in which the same reference numerals will be used to refer to the same or similar parts for the sake of clarity.

Figure 13:
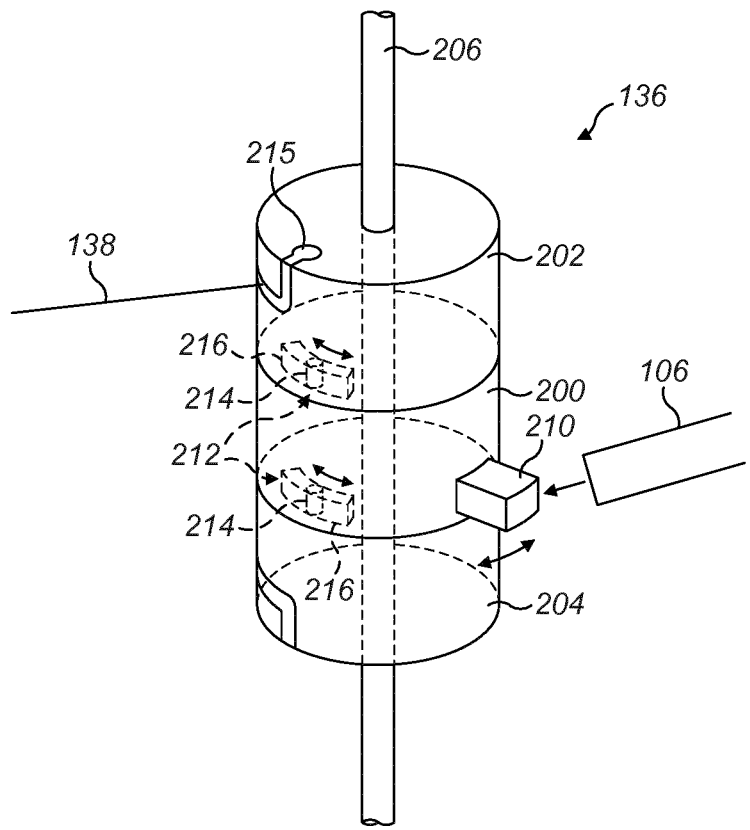
FIG. 13 is a perspective view of a door latch release actuator in accordance with an alternative embodiment.

Referring to FIG. 13, an actuator that may be used in place of the actuator 136 in the previous Figures comprises three principle pieces, which are barrel- or drum-like in shape. Hereinafter, each piece will be referred to as a drum for ease of reference.

As can be seen in FIG. 13, a drive portion of the actuator in the form of a central drum 200 is flanked by first and second side drums 202, 204. Each of the drums is rotatably mounted on a spindle 206 and are held on that spindle so that the drums are in contact with one another since it is important for their operation that the drums are close neighbours. It is envisaged that the drums are made from a material that allows them to slide against each other even though they are in contact, such as a metal or a suitably hard engineering plastics.

The actuator functions in the same way as the actuator 136 in the previous embodiment in the sense that it is driven by the handle arrangement 102 in a range of movement and that it operates a link/Bowden cable 138 during only a sub-range or sub-portion of that movement. Here, the cable 138 is shown connected to the side drum 202 at cable retainer 215.

So, with this in mind, the central drum 200 is driven by the handle 106 and includes a drive lever 210 which is equivalent to the levers 150 in the actuator of the previous embodiments. As the handle moves from the stowed to the deployed position, the central drum 200 rotates but does not move the side drums 202, 204, and so it does not pull on the Bowden cable 138. However, once the handle 106 moves from its deployed state to the operative state, this movement will cause the central drum 200 to rotate further and carry the side drums 202, 204 with it, thereby pulling on the Bowden cable 138. It will be appreciated therefore that the side drums 202,204 are equivalent to the link control portions of the previous embodiments.

The mechanism that enables this is a cooperative pin and slot arrangement 212 provided at the respective interfaces between the central drum 200 and the side drums 202,204.

In this embodiment, the pin and slot arrangement 212 includes a pair of pins 214 provided one on each side face of the central drum 200 and a cooperating pair of slots 216, one provided on the inner face of each of the side drums 202, 204. The pin and slot arrangement 212 functions in the same way as the end nipple 156 and the guide slot 152 in the previous embodiment.

At this point it will be noted that although the pin and slot arrangement 212 includes a pair of pins 214 and a pair of slots 216, this is only to ensure that the actuator is 'non-handed'. So, the same component could be used in the same orientation on both sides of the vehicle.

Figure 14A:
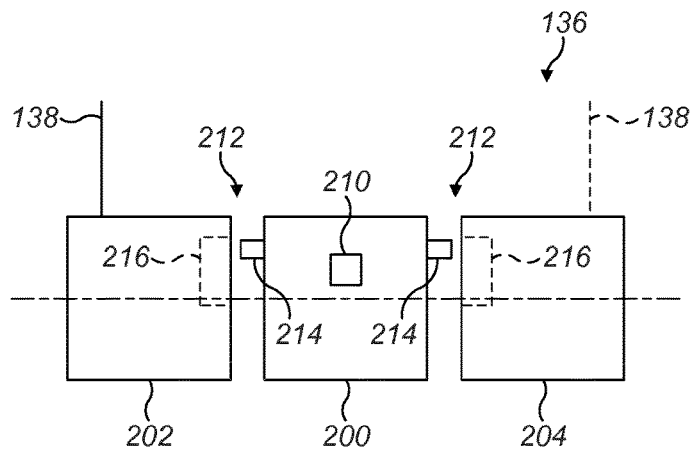
FIGS. 14a, 14b and 14c are a sequence of views illustrating the operation of the door latch release actuator in FIG. 13.
Figure 14B:
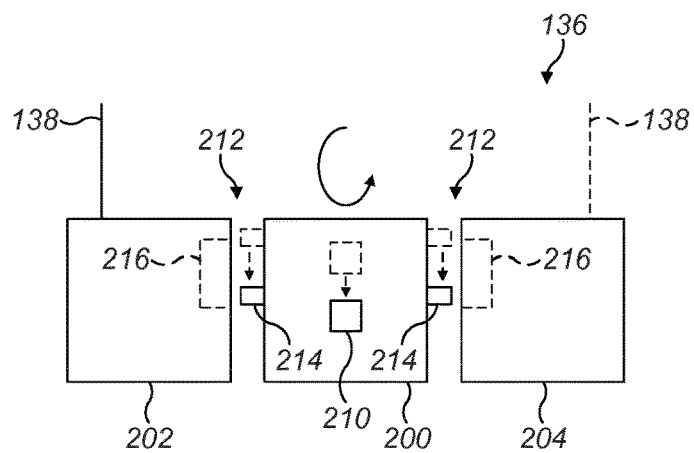
Figure 14C:
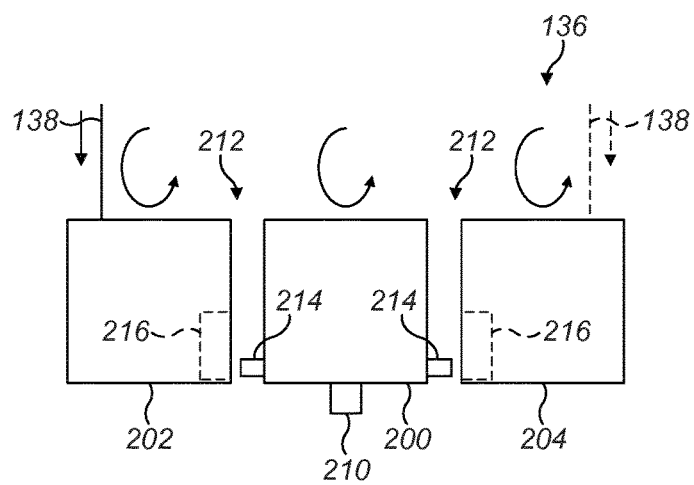

The operation of the actuator in FIG. 13 is illustrated step-by-step in FIGS. 14a, 14b and 14c. The separate drums of the actuator have been separated in these figures for ease of understanding.

FIG. 14a shows the actuator 136 in a position corresponding to the handle 106 being in the stowed state. In this position, the pair of pins 214 are at rest in the upper end of their respective slots 216.

FIG. 14b shows the actuator 136 in a position which corresponds to the handle being in the deployed state. Here it can be seen that the central drum 200 has been rotated by the lever 210 such that the pins 214 have moved along their respective slots 216. However, it will be noted that the pins 214 have not caused the side drums 202, 204 to rotate and so the Bowden cable 138 has not been pulled.

FIG. 14c shows the actuator in a position which corresponds to the handle being in the operative state. Here it can be seen that the pins 216 have engaged with the ends of their respective slots 216 so that further movement of the lever 210 causes the central drum 200 to rotate the side drums 202, 204. As a result the side drum 202 pulls on the Bowden cable 138 which activates the door latch, as described above.

Although not shown in the figures, it should be noted that one or more of the drums 200, 202, 204 may be spring biased on the spindle by, for example, a suitable internal torsion spring (not show) to apply a comparable reverse bias as provided by the spring 149 in the FIG. 12 embodiment.

This description will now discuss alternative handle arrangements with reference to FIG. 15 to FIGS. 18a to c.

A door handle arrangement 302 of this embodiment is retractable with respect to a door of a vehicle. An outer surface or 'door skin' 304 is shown here as representing the door, which can be considered to be a body component of the vehicle, although it may not be an openable panel of the vehicle. The door handle arrangement 302 includes a handle 306 that is substantially flush-mounted with respect to the door skin 304 when the handle 306 is in a stowed state, as shown here. The handle 306 is operable to transition from the stowed state to a deployed state in which it protrudes from the door skin 304 so that it can be grasped by a user, as will be described.

The door skin 304 is penetrated by a horizontally-extending aperture 308, hereinafter 'slot', that receives the handle 306 in a close fit. The outer surface 310 of the handle 306 is shaped to match that of the slot 308 and lies flush with the surrounding surface of the door skin 304 when the handle 306 is stowed as in FIG. 1. The shape of the slot 308 and the outer surface 310 of the handle 306 is chosen largely for aesthetic reasons.

Figure 15:
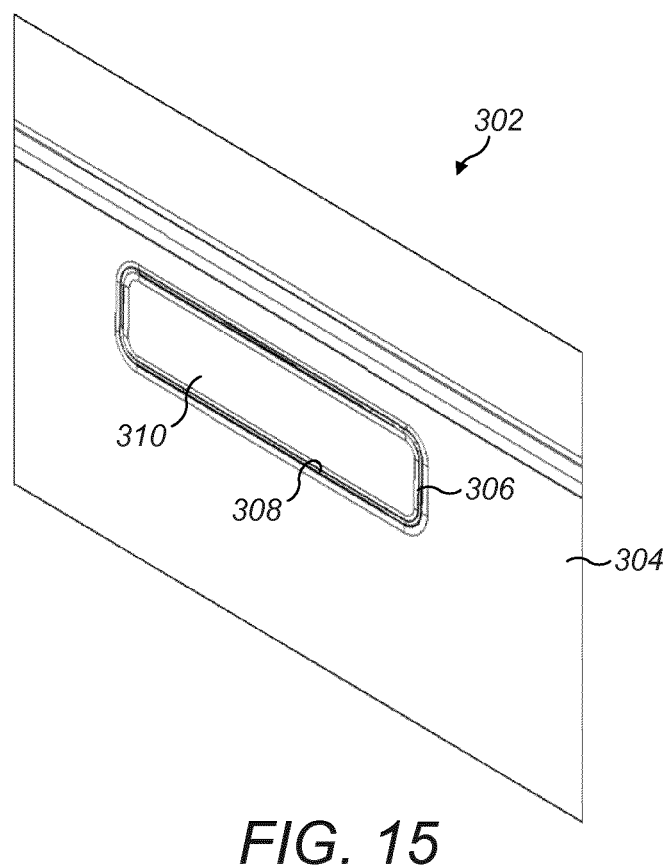
FIG. 15 is a perspective view of a vehicle door panel equipped with a retractable handle arrangement, in accordance with another embodiment of the invention, that is shown in a stowed state.

Although in FIG. 15 only the outer surface 310 of the handle 306 can be seen, the remaining Figures show the handle arrangement 302 in more detail.

The retractable handle arrangement 302 comprises a drive means/arrangement 312 which is operable to move the handle 306 between the stowed state and a deployed state as will be described in detail. The drive arrangement 312 is electrically operated and is shown here largely in schematic form as comprising an electrical drive unit 314, such as a motor or solenoid, that is operable to drive a spindle 316 on which the handle 306 is mounted via a primary linkage or swing arm 327. It is envisaged that the drive unit 314 may act on the spindle 316 through a suitable worm gear or rack and pinion (not shown) in order to provide fine positioning control of the spindle 316 and, thus, of the handle 306. It should be noted that the drive arrangement 312 depicted here represents one way in which the handle 306 may be moved angularly between its stowed and deployed states and that other ways would be apparent to the skilled person.

In more detail, the handle 306 is an elongate member having first and second ends 320, 322. A pivot 324 is disposed at the first end 320 of the handle 306 by which the handle 306 is coupled or mounted to a handle support structure 325 and cooperates with the drive arrangement 312 in order to allow the handle 306 to move angularly with respect to the slot 308 between stowed and deployed states. A strap-type handle loop 326 defined at the second end 320 of the handle loop. The loop provides a handgrip 328 that defines the outer surface 310 of the handle 306, with end pieces 330, 332 at opposed ends spacing the handgrip 328 from an inner member 334 that is shaped like the handgrip 328 so as to substantially fill the slot 308 when the handle is deployed, as shown in FIG. 16c.

The end pieces 330,332 are generally parallel to each other and are slightly curved in plan view. Together, the handgrip 328, end pieces 330, 332 and the inner member 334 form an approximate truncated wedge shape, such a shape again being determined mainly for aesthetic reasons.

The swing arm 327 couples the handle 306 to a support structure 325 at the pivot 324 and cooperates with the drive arrangement 312 in order to allow the handle 306 to move angularly with respect to the slot 308 between stowed and deployed states. The spindle 316 thus defines a primary pivot axis at pivot 324.

Figure 16A:
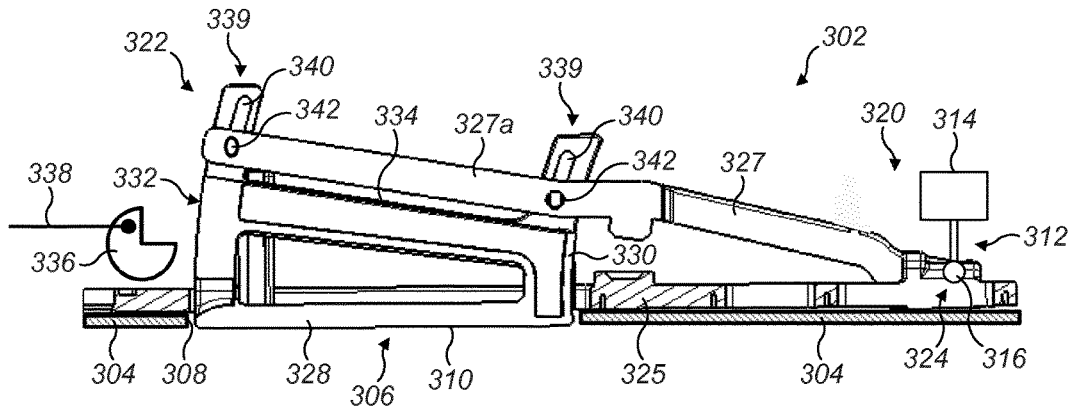
FIGS. 16a, 16b and 16c are a sequence of top sectional views of a further alternative embodiment of the door and handle arrangement of FIG. 15, with the door handle being shown respectively in stowed, deployed and operative states.
Figure 16B:
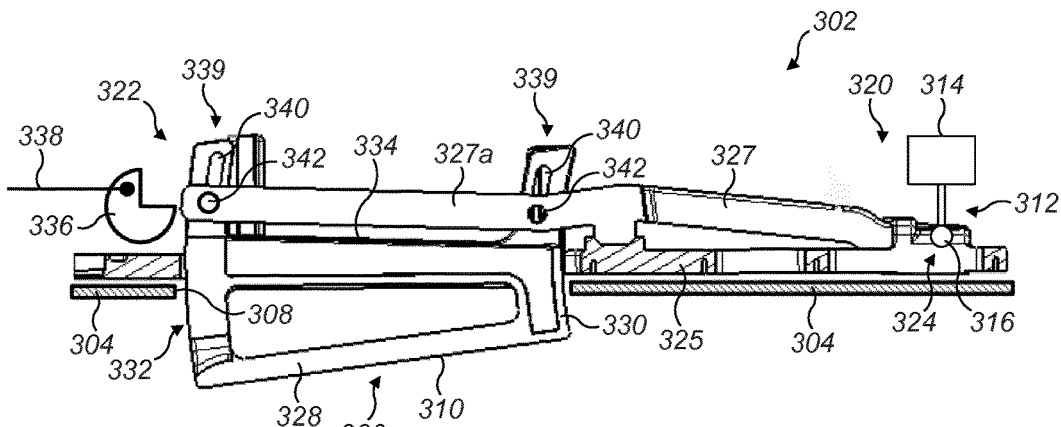
Figure 16C:
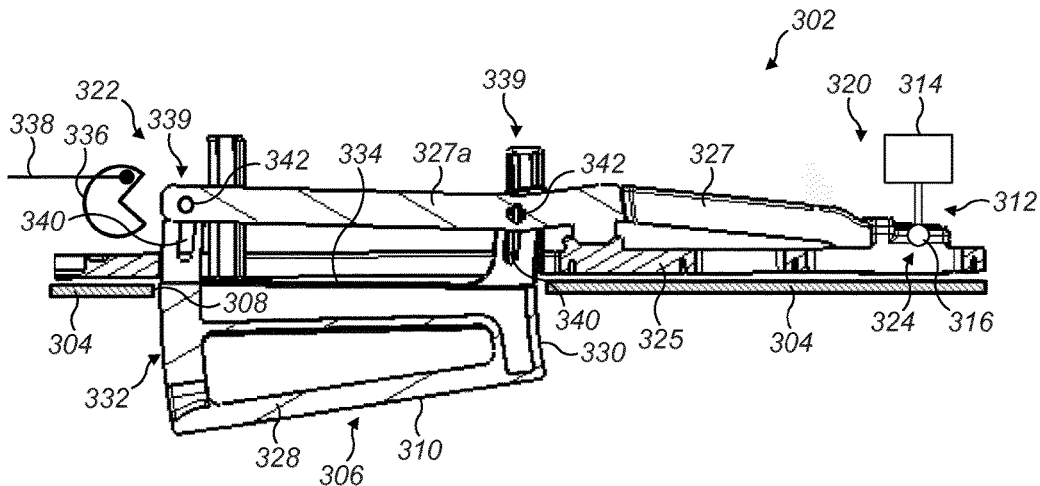

Whereas FIG. 16a shows the handle 306 in the stowed state, such that the handle surface is substantially flush with the door skin 304, FIG. 16b shows the handle as deployed, in which the handgrip 328 has popped out of the slot 308 so as to stand proud of the surrounding door skin 304. This reveals the handle 306 so that the user can grasp the handgrip 328 and move the handle 306 angularly against a spring bias (not shown) to pull the handle arrangement 302 into an operative state so as to unlatch the door, as will be described.

When grasping the handgrip 328 to pull the handle 306, the user's fingers and possibly also the thumb can extend between the handgrip 328 and the inner member 334. Since the handle 306 is open from the top and bottom, this allows the user to approach the handle 306 with an overhand or an underhand grip, whichever is more comfortable.

The handle 306 may be driven by the drive arrangement 312 from its stowed state to its deployed state in response to various events. For example, this movement may be in response to an unlocking signal from a key authorised to unlock the vehicle or from a proximity sensor that detects the presence of an authorised key in the immediate vicinity of the vehicle. Conversely, the handle 306 may be driven from the deployed to the stowed state in response to a locking signal from a key authorised to lock the vehicle or from a proximity sensor that determines that the authorised key has left the immediate vicinity of the vehicle, or in response to the vehicle moving off. Alternatively, the handle 306 may toggle between the stowed and deployed states in response to different user actions, for example the user may press and lock/unlock switch (not shown) somewhere in the vehicle door.

Once in the deployed state, the handle 306 can then be pulled to open the door, which involves the user moving the handle 306 such that it moves linearly with respect to the swing arm 327 against a spring bias (not shown) into an 'actuated' or 'operative' state, as shown in FIG. 16c.

In moving from the deployed to the operative state, the handle 306 may unlatch the door mechanically or electrically. For example, to unlatch the door mechanically, the handle 306 may be provided with a suitable latching mechanism 336 that is cooperable with a link in the form of a Bowden cable 338 that acts on the door latch (not shown) in a manner that is generally known in the art and so is not disclosed here in detail. Alternatively, the door handle 306 may be configured to cooperate with a limit switch such that in the operative state the limit switch is triggered so as to send a door opening signal to a body control module (BCM) of the vehicle which then commands the relevant door to be unlatched. Such a mechanism is also known to the skilled person and so is not described in detail here.

The discussion above has focussed on the movement of the handle 306 as it transitions from its stowed state in which it lies substantially flush with the door skin 4, to the deployed state in which it is driven by the drive unit 314 to protrude from the door. During this movement, the handle pivots about the primary pivot 324 to as to move angularly. However, in moving from the deployed to the operative position so as to unlatch the door, the handle arrangement is configured such that the handle 306 performs a substantially translational movement, such that it follows a more linear or substantially linear path between the deployed and operative states. This improves the ergonomics of the handle arrangement for the user during door opening. It also provides a space efficient arrangement for being housed within the interior volume of the door.

To enable the translational movement between the deployed and operative states, the handle arrangement is provided with suitable guide means defined partly by the swing arm 327 and partly by the handle 306, those two components configured to cooperate so that the handle 306 translates or follows a more linear path with respect to the swing arm 327 instead of an angular path.

In the illustrated embodiment of FIGS. 16a-16c, the guide means 339 takes the form of a cooperating pair of guide slots 340 and guide pins 342.

Here, the guide slots 340 are formed in respective elongate guide arms 344 that extend from the inner member 334 at each end 330,332 of the handle 306 in a direction away from the door skin 304. Each of the guide arms 344 defines a respective one of the slots 342.

The guide pins 342 are provided by the swing arm 327 in a linear extension portion 327a thereof which extends generally parallel with the inner member 334 of the handle 306. Here, two guide pins 342 are provided and are spaced apart corresponding to the spacing of the guide slots 340. The precise structure of the guide pins 342 may take various forms, for example the pins may be rivets fastened to suitable apertures in the swing arm or they may be welded onto the swing arm. Other configurations would also be apparent to the skilled person.

As can be seen by comparing FIGS. 16a and 16b, in moving from the stowed to the deployed position, the guide slots 340 do not slide relative to the guide pins 342 such that the handle 306 stays in a fixed position relative to the swing arm 327. Though not shown here, it will be appreciated that suitable biasing means may be provided to bias the handle 306 towards an inner position with respect to the swing arm 327 so that it does not move unintentionally. It is envisaged that the biasing means may be provided by spring acting in tension between the handle 306 and the swing arm 327. Alternatively, the latching mechanism 336 could be configured to provide the biasing means such that a spring loaded portion of the latching mechanism 336 is coupled to the handle 306 so as to move with the handle during movement between the stowed and deployed states but provides a reverse bias force on the handle 306.

The operative state of the handle arrangement 302 is shown in FIG. 16c and, by comparing this with the previous two figures it can be seen that the handle 306 has moved further outwards beyond the door skin 304 and has moved along a substantially linear path, as determined by the linear shape of the guide slots 340, which are generally parallel in this embodiment. In this position of the handle 306, the guide pins 342 are shifted to the inner end of the slots 340 and this limits the range of movement of the handle 306. It will be noted at this point that the latching mechanism 336 has been rotated by movement of the handle 306 between a latched state, as illustrated in FIGS. 16a and 16b, to an unlatched state, the rotation of the latching mechanism 336 pulling on the Bowden cable 338 to trigger unlatching of the door. Not shown here is how the handle 306 cooperates with the latching mechanism 336, although the skilled person would understand that there are various ways in which this could be achieved, for example the handle may be provided with a lug or hook that cooperates with an eye on the latching mechanism so that it can be rotated by movement of the handle 306. Other methods of translating linear motion of the handle into rotational motion of the latching mechanism will be well understood by the skilled person.

An alternative embodiment of handle arrangement will now be described with reference to FIGS. 17a, 17b and 17c. This embodiment shares several features with the previous embodiment. Therefore, the same reference numerals will be used to refer to common features for clarity. Also, only the differences will be described here for brevity. Note that in this embodiment, the handle arrangement 302 is configured to move angularly between stowed and deployed states, but to substantially move in a translation, which is substantially linear in this embodiment, from the deployed to the operative state, in the same way as the previous embodiment. However, the way in which it achieves the linear movement is different, as will now be explained in more detail.

In this embodiment, the guide means 339 takes the form of a telescopic mechanism, formed partly by the swing arm 327 and partly by the handle 306. In the illustrated embodiment, the telescopic mechanism comprises a cooperating pair of guide rods 346 and a respective pair of rod receivers or sliders 348.

The guide rods 346 extend from the extension portion 327a of the swing arm, at positions corresponding to each end 330,332 of the handle 306, towards the door skin 304.

The rod receivers 348 are defined at each end 330,332 of the handle 306 and take the form of bores shaped so as to receive the guide rods 346 in a sliding fit.

Figure 17A:
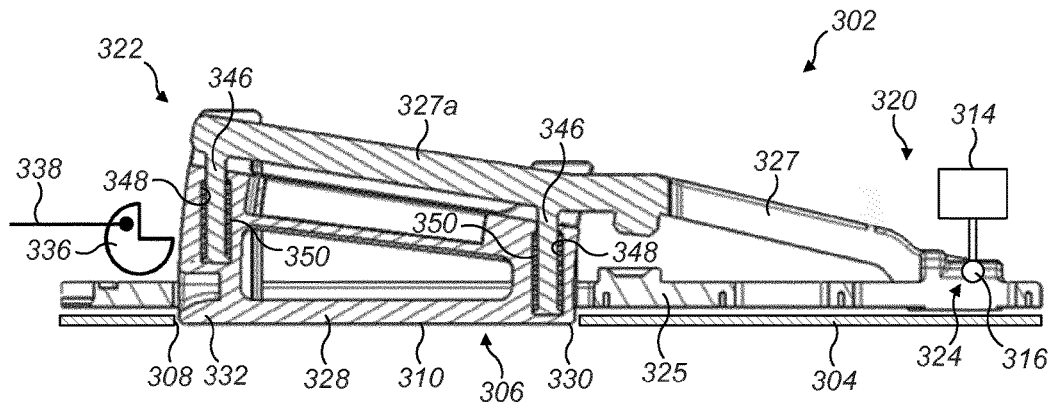
FIGS. 17a, 17b and 17c are a sequence of top sectional views of an another alternative embodiment of the door and handle arrangement of FIG. 15, with the door handle again being shown respectively in stowed, deployed and operative states.
Figure 17B:
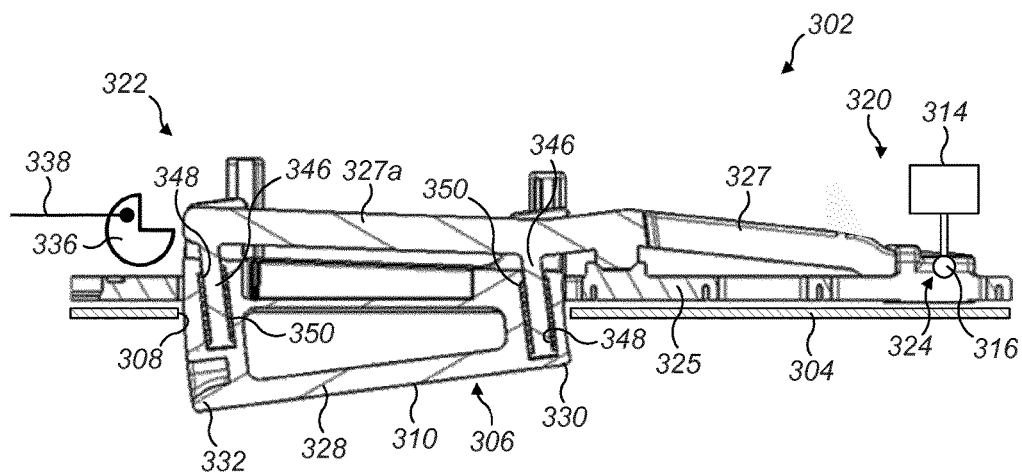

As can be seen by comparing FIGS. 17a and 17b, in moving from the stowed to the deployed position, the rod receivers 348 do not slide relative to the guide rods 346 such that the handle 306 remains in a fixed position relative to the swing arm 327. A biasing means is provided to apply a suitable force to the handle to urge it into the retracted position relative to the swing arm 327. Here, the biasing means is in the form of a coil spring 350 that is located between each of the guide rods 346 and the respective rod receiver 348. The coil springs 350 act in tension so as to provide a resilient bias away against outward movement of the handle 306 away from the swing arm 327. It should be noted that although coil springs housed in the rod receivers 348 are shown in this embodiment, other biasing configurations are envisaged. For example, a return spring may be configured to act in tension between the swing arm 327 and a mid-point of the inner member 334 of the handle 306.

Alternatively the latching mechanism 336 may be configured to provide the biasing force, as described for the previous embodiment.

Figure 17C:
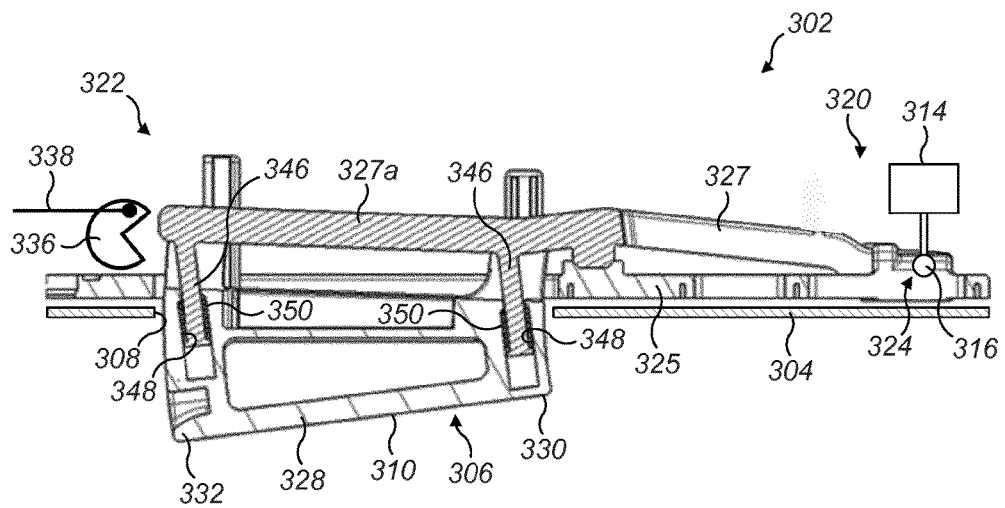

Moving to FIG. 17c, which shows the handle arrangement 302 in the operative state, by comparing this with FIGS. 17b and 17c it will be appreciated that the handle 306 has moved further outwards beyond the door skin 304 and has performed a translation along a substantially linear path, as is dictated by the shape of the guide rods 346 and the rod receivers 348. As in the previous embodiment, the latching mechanism 336 has been rotated by movement of the handle 306 between a latched state (FIG. 17a,b) to an unlatched state thereby to trigger unlatching of the door via the Bowden cable 338.

Figure 18A:
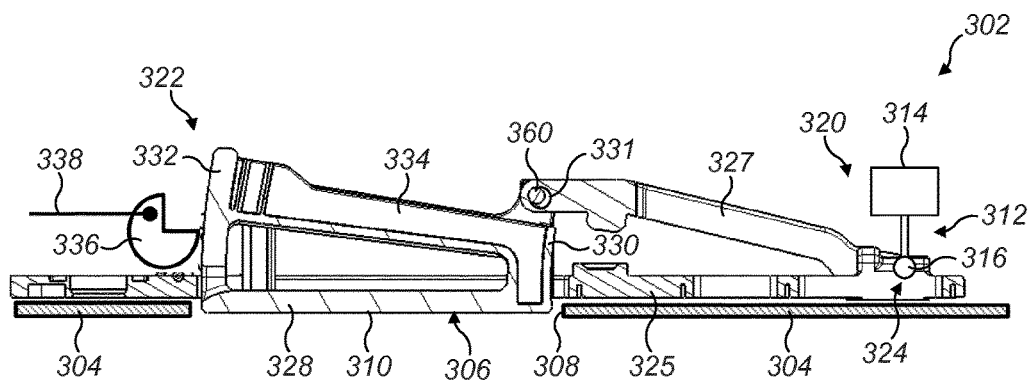
FIGS. 18a, 18b and 18c are a sequence of top sectional views of a further alternative embodiment of the door and handle arrangement of FIG. 15, with the door handle again being shown respectively in stowed, deployed and operative states.
Figure 18B:
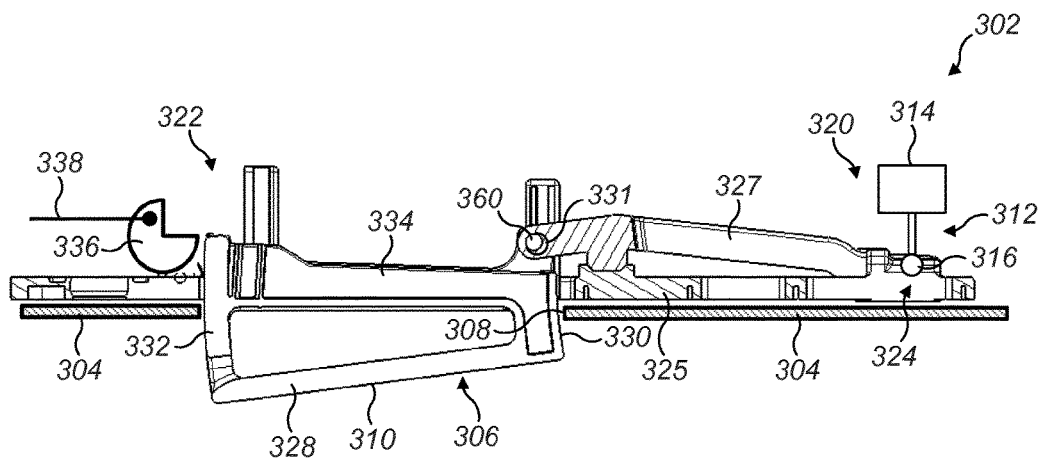
Figure 18C:
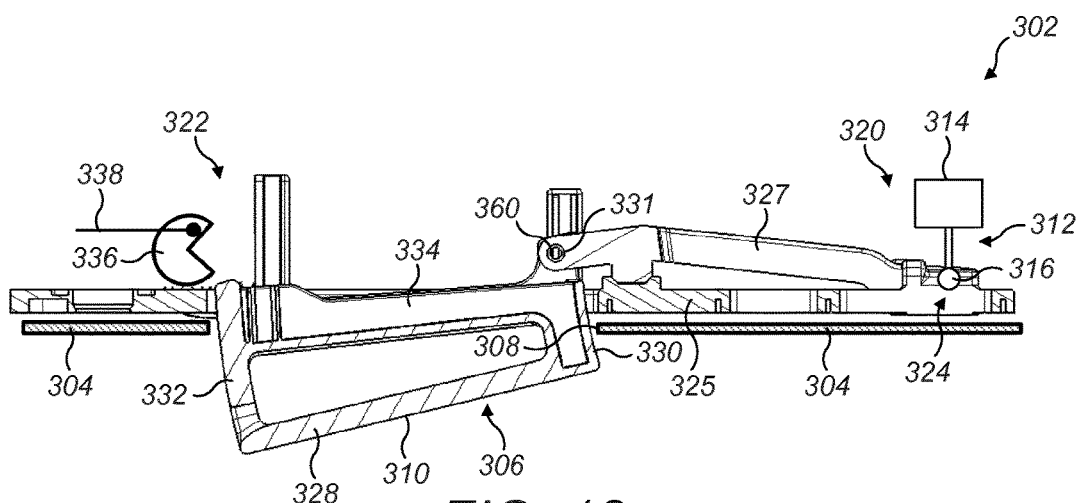

Turning now to FIGS. 18a, 18b and 18c, there is shown a further alternative handle arrangement that, again, is similar to the previous embodiments so the same reference numerals will be used in the following description as appropriate.

In contrast to the other embodiments, in which the handle 306 moves between the deployed and the operative states by way of a translational movement, in this embodiment the handle 306 moves from the deployed to the operative state by way of an angular movement.

Instead of being configured to slide linearly with respect to the swing arm 327 e.g. either by way of guide slots or a telescopic mechanism of the previous embodiments, the handle 306 is pivotably attached to the swing arm 327 at a second pivot 360.

The second pivot is located at the inner end of the handle 306 and so rotatably couples that end of the handle 306 to the distal end of the swing arm 327.

The handle arrangement 302 moves between the stowed and deployed states in much the same way as the other embodiments and this movement is shown by contrasting FIGS. 18a and 18b. In FIG. 18a, the outer surface 310 of the handle 306 is substantially flush with the door skin 304 and the swing arm 327 is angled relative to the handle support structure, whereas in FIG. 18b the swing arm 327 has pivoted about the primary pivot 324 at spindle 316 so as to move the handle 306 out of the slot 308 such that the handgrip 328 stands proud of the door skin 304. In moving between these positions, the latching mechanism 336 is not actuated, as can be seen by its identical positions in FIGS. 18a and 18b. Suitable biasing means may be provided to maintain the handle 306 in a fixed position with respect to the swing arm 327 as it moves between the stowed and deployed states. Here, suitable biasing means is shown as provided as a torsion spring 331 at the second pivot 360.

Moving on to FIG. 18c, it will be seen that the handle 306 has moved angularly about second pivot 360 into the operative position whereby the latching mechanism 336 is triggered to rotate clockwise so as to pull on the Bowden cable 338 thereby causing the door to be unlatched, in the same way as the previous embodiments.

Although differing from the previous embodiments in the manner of its movement between the deployed and operative states, the handle arrangement of this embodiment provides a particularly elegant solution for a retractable handle which has a low part count and so is relatively light in weight, as well as providing a large handle deployment travel compared to the low packaging volume of the handle within the door interior. By virtue of the low part count, the handle arrangement is also reliable since there are fewer moving parts to fail.

It will be appreciated that the embodiments shown in FIGS. 16a-16c may be modified by changing the shape of the guide slots 340 to an arcuate shape, and the embodiment shown in FIGS. 17*a*-17*c*, may be modified by changing the shape of the guide rods 346 and rod receivers 38 to a curved profile so as to adapt the embodiments of FIGS. 16*a*-16*c* and 17*a*-17*c* so as to provide non-linear, i.e. arcuate, movement of the handle 306 between the deployed state and the operative state.

In the various embodiments described above, it will be understood that the term 'support structure' is used to describe a structure that supports the handle for pivotable movement and also to hold the handle between its extremes of movement. Accordingly the support structure may be a single part of a compound structure for example as constituted by the door, its supporting pivot points, inner door skin and limit stops.

It should also be understood that the term 'deployed' does not imply a precise positioning of the handle with respect to the support structure or door skin, but merely to convey that the handle is moved to a position beyond or outboard of the door so that a user may grip the handle for operation.

The invention claimed is:

1. A retractable handle arrangement comprising a handle and a swing-arm, wherein the swing-arm is moveable about a pivot axis and arranged to couple the handle to a support structure for movement between a stowed state and a deployed state, and wherein the swing arm comprises an engagement means that, in the stowed state, is spaced apart from the support structure and, in the deployed state, engages the support structure so as to substantially prevent lateral play of the handle, wherein the handle is pivotally coupled to the swing arm so as to be movable from the deployed position to an operative state in which the handle acts to unlatch the door.

2. The handle arrangement of claim 1 wherein the engagement means comprises first upper and lower location surfaces arranged to engage with second upper and lower location surfaces, respectively, when the engagement means is engaged with the support structure, wherein the second upper and lower location surfaces are located on or attached to the support structure.

3. The handle arrangement of claim 2 wherein the engagement means comprises at least one protrusion extending from the swing arm, and wherein external surfaces of the at least one protrusion define the first upper and lower location surfaces.

4. The handle arrangement of claim 3 wherein the protrusion comprises a stud.

5. The handle arrangement of claim 4, wherein an outer profile of the stud comprises a section which has a first truncated rectangular pyramidal shape.

6. The handle arrangement of claim 5, further comprising a locator for attachment to the support structure and wherein the locator has at least one protrusion thereon, and wherein external surfaces of the at least one protrusion define the second upper and lower location surfaces, which, in use, locate in the recess on the swing arm.

7. The handle arrangement of claim 6, wherein the engagement means comprises a recess on the swing arm, and wherein internal surfaces of the recess define the first upper and lower location surfaces and the outer profile of the at least one protrusion comprises a section which has a second truncated rectangular pyramidal shape.

8. The handle arrangement of claim 3, further comprising a locator for attachment to the support structure and wherein the locator has a support structure recess therein, and wherein the surfaces of the support structure recess define the second upper and lower location surfaces, and in which, in use, the protrusion of the swing arm locates.

9. The handle arrangement of claim 8, wherein the protrusion comprises a stud and the recess has a truncated rectangular pyramidal shape.

10. The handle arrangement of claim 2 wherein the engagement means comprises a swing arm recess on the swing arm, and wherein internal surfaces of the swing arm recess define the first upper and lower location surfaces.

11. The handle arrangement of claim 10, wherein an inner profile of the swing arm recess has a truncated rectangular pyramidal shape.

12. The handle arrangement of claim 1, wherein the engagement means comprises a stud provided on the support structure which is engageable with a socket provided on the swing arm.

13. The handle arrangement of claim 12, wherein the stud defines an outer profile that is shaped to substantially match an inner profile defined by the socket.

14. A body component for a vehicle comprising a panel having an outer surface defining an aperture for receiving the handle of the retractable handle arrangement of claim 1, wherein the handle substantially fills the aperture and lies substantially flush with the outer surface of the panel when the handle is in the stowed position.

15. The body component of claim 14 wherein, in the stowed state the handle lies substantially flush with the outer surface of the panel.

16. The body component of claim 14 wherein, in the deployed state in which the handle protrudes from the outer surface of the panel.

17. The body component according to claim 14 wherein the body panel comprises a vehicle door.

18. A vehicle including the body component of claim 14, or the retractable handle arrangement of claim 1.

* * * * *